(12) United States Patent
Lee et al.

(10) Patent No.: US 10,506,239 B2
(45) Date of Patent: *Dec. 10, 2019

(54) METHOD AND DEVICE FOR INTRA PREDICTION VIDEO

(71) Applicant: SAMSUNG ELECTRONICS CO., LTD., Suwon-si (KR)

(72) Inventors: Tammy Lee, Seoul (KR); Jianle Chen, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/366,184

(22) Filed: Mar. 27, 2019

(65) Prior Publication Data

US 2019/0222850 A1 Jul. 18, 2019

Related U.S. Application Data

(63) Continuation of application No. 15/851,228, filed on Dec. 21, 2017, now Pat. No. 10,291,919, which is a
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS

| 4,837,624 A | 6/1989 | Heitmann et al. |
| 8,442,334 B2 | 5/2013 | Drugeon et al. |

(Continued)

FOREIGN PATENT DOCUMENTS

| CN | 101352046 A | 1/2009 |
| CN | 101365136 A | 2/2009 |

(Continued)

OTHER PUBLICATIONS

Communication dated Apr. 18, 2019, issued by the Indonesian Patent Office in counterpart Indonesian Application No. P00201701066.
(Continued)

*Primary Examiner* — Peter D Le
(74) *Attorney, Agent, or Firm* — Sughrue Mion, PLLC

(57) ABSTRACT

A method and apparatus for intra predicting a video. The method includes: determining availability of a predetermined number of adjacent pixels used for intra prediction of a current block; if a first adjacent pixel is unavailable, searching for a second adjacent pixel that is available by searching the predetermined number of adjacent pixels in a predetermined direction based on the first adjacent pixel; and replacing a pixel value of the first adjacent pixel with a pixel value of a found second adjacent pixel. At least one third adjacent pixel in another location, which is not available and excludes the first adjacent pixel at a predetermined location, is to sequentially replaced by using a directly adjacent pixel in a predetermined direction.

3 Claims, 30 Drawing Sheets

Related U.S. Application Data continuation of application No. 15/352,103, filed on Nov. 15, 2016, now Pat. No. 9,883,191, which is a continuation of application No. 14/354,722, filed as application No. PCT/KR2012/008938 on Oct. 29, 2012, now Pat. No. 9,621,918.

(60) Provisional application No. 61/552,692, filed on Oct. 28, 2011.

(51) Int. Cl.
    *H04N 19/176* (2014.01)
    *H04N 19/11* (2014.01)
    *H04N 19/136* (2014.01)
    *H04N 19/182* (2014.01)
    *H04N 19/593* (2014.01)

(52) U.S. Cl.
    CPC ......... *H04N 19/136* (2014.11); *H04N 19/176* (2014.11); *H04N 19/182* (2014.11); *H04N 19/593* (2014.11)

(56) References Cited

U.S. PATENT DOCUMENTS

| | | | |
|---|---|---|---|
| 8,553,768 | B2 | 10/2013 | Song |
| 8,594,198 | B2 | 11/2013 | Xi |
| 8,837,577 | B2 | 9/2014 | Segall et al. |
| 8,885,707 | B2 | 11/2014 | Adachi et al. |
| 8,885,956 | B2 | 11/2014 | Sato |
| 8,976,862 | B2 | 3/2015 | Kim et al. |
| 9,031,130 | B2 | 5/2015 | Suzuki et al. |
| 9,071,849 | B2 | 6/2015 | Yoon et al. |
| 9,154,808 | B2 | 10/2015 | Pandit et al. |
| 9,338,475 | B2 | 5/2016 | Chiu et al. |
| 9,420,290 | B2 | 8/2016 | Wang et al. |
| 2004/0136458 | A1 | 7/2004 | Dahlhoff et al. |
| 2006/0120450 | A1 | 6/2006 | Han et al. |
| 2008/0056371 | A1 | 3/2008 | Sekiguchi et al. |
| 2008/0232471 | A1 | 9/2008 | Mittal et al. |
| 2008/0240587 | A1 | 10/2008 | Au et al. |
| 2009/0089549 | A1 | 4/2009 | Liu et al. |
| 2009/0116549 | A1 | 5/2009 | Shen et al. |
| 2009/0274211 | A1 | 11/2009 | Zhou et al. |
| 2010/0027615 | A1 | 2/2010 | Pandit et al. |
| 2010/0232505 | A1 | 9/2010 | Thoreau et al. |
| 2010/0260261 | A1 | 10/2010 | Kotaka et al. |
| 2011/0135000 | A1 | 6/2011 | Alshina et al. |
| 2011/0188574 | A1 | 8/2011 | Matsuo et al. |
| 2012/0314767 | A1 | 12/2012 | Wang et al. |
| 2014/0079121 | A1 | 3/2014 | Song et al. |
| 2014/0328397 | A1 | 11/2014 | Jeon et al. |
| 2014/0376630 | A1 | 12/2014 | Sato |
| 2015/0124880 | A1 | 5/2015 | Kim et al. |

FOREIGN PATENT DOCUMENTS

| | | |
|---|---|---|
| CN | 101385356 A | 3/2009 |
| CN | 101682781 A | 3/2010 |
| CN | 101854540 A | 10/2010 |
| CN | 102186086 A | 9/2011 |
| EP | 1 411 714 A2 | 4/2004 |
| EP | 2661086 A1 | 11/2013 |
| EP | 2696583 A2 | 2/2014 |
| KR | 10-2006-0063532 A | 6/2006 |
| KR | 10-2009-0095316 A | 9/2009 |
| KR | 10-2010-0095914 A | 9/2010 |
| KR | 10-2011-0018188 A | 2/2011 |
| KR | 10-2011-0065090 A | 6/2011 |
| RU | 2407221 C1 | 12/2010 |
| TW | 200704196 A | 1/2007 |
| TW | 200740246 A | 10/2007 |
| WO | 2006106935 A1 | 10/2006 |
| WO | 2009/157669 A2 | 12/2009 |
| WO | 2011/001865 A1 | 1/2011 |
| WO | 2011/021839 A2 | 2/2011 |
| WO | 2011/079671 A1 | 7/2011 |
| WO | 2012134085 A2 | 10/2012 |

OTHER PUBLICATIONS

Communication dated Jun. 3, 2019, issued by the Chinese Patent Office in counterpart Chinese Application No. 201710586989.2.
Communication dated May 30, 2019, issued by the Chinese Patent Office in counterpart Chinese Application No. 201710585486.3.
Communication dated Jul. 3, 2019, issued by the Chinese Patent Office in counterpart Chinese Application No. 201710585311.2.
Communication dated Jul. 2, 2019, issued by the Indonesian Patent Office in counterpart Indonesian Application No. P00201701068.
Search Report and Written Opinion (PCT/ISA/210 & PCT/ISA/237) dated Feb. 26, 2013 issued by the International Searching Authority in counterpart International Application No. PCT/KR2012/008938.
Communication dated Jul. 14, 2015 issued by European Patent Office in counterpart European Application No. 12843295.2.
Lin et al., "CE4 Subset2: Report of Intra Coding Improvements for Slice Boundary Blocks", Joint Collaborative Team on Video Coding (JCT-VC) of ITU-T SG16 WP3 and ISO/IEC JTC1/SC29/WG11, Mar. 16-23, 2011, 6 pages total, Geneva, JCTVC-E283.
Wahadaniah et al., "Constrained intra prediction scheme for flexible-sized prediction units in HEVC", Joint Collaborative Team on Video Coding (JCT-VC) of ITU-T SG16 WP3 and ISO/IEC JTC1/SC29/WG11, Mar. 16-23, 2011, 9 pages total, Geneva, CH, JCTVC-E203.
Sjoberg et al., "Constrained Intra source code implementation", Joint Collaborative Team on Video Coding (JCT-VC) of ITU-T SG16 WP3 and ISO/IEC JTC1/SC29AVG11, Jan. 20-28, 2011, 3 pages total, Daegu, KR, JCTVC-D386.
Lee et al., "Non-CE6: Simplified reference samples padding for intra prediction", Joint Collaborative Team on Video Coding (JCT-VC) of ITU-T SG16 WP3 and ISO/IEC JTC1/SC29/WG11, Nov. 21-30, 2011, 9 pages total, Geneva, CH.
Communication dated May 12, 2015 issued by Japanese Patent Office in counterpart Japanese Patent Application No. 2014-538720.
Wahadaniah et al., "Constrained Intra Prediction Scheme for Flexible-Sized Prediction Units in HEVC", Joint Collaborative Team on Video Coding (JCT-VC) of ITU-T SG16 WP3 and ISO/IEC JTC1/SC29/WG11, Jan. 20-28, 2011, 9 pages total, Daegu, KR, JCTVC-D094.
Sjoberg et al., "BoG report on padding of unavailable reference samples for intra prediction", Joint Collaborative Team on Video Coding (JCT-VC) of ITU-T SG16 WP3 and ISO/IEC JTC1/SC29/WG11, Mar. 16-23, 2011, 6 pages total, Geneva, CH, JCTVC-E488.
Communication dated Jan. 19, 2016, issued by the Japanese Intellectual Property Office in counterpart Japanese Application No. 2014-538720.
Communication dated Feb. 2, 2016, issued by the Australian Intellectual Property Office in counterpart Australian Application No. 2015202343.
Xianglin Wang et al., "AHG16: Padding Process Simplification", Joint Collaborative Team on Video Coding (JCT-VC) of ITU-T SG16 WP3 and ISO/IEC JTC1/SC29/WG11, JCTVC-G812, 7th Meeting: Geneva, Nov. 21-30, 2011, Total 6 pages, Cited on Jan. 19, 2016 communication in JP 2014538720.
Communication dated Nov. 11, 2016, from the State Intellectual Property Office of People's Republic of China in counterpart Application No. 201280065620.2.
Communication dated Nov. 30, 2016, from the Intellectual Property Office of Taiwan in counterpart application No. 101139954.
Communication dated Jan. 17, 2017, from the Russian Patent Office in counterpart application No. 2016117393/07.
Communication dated Jan. 27, 2017, issued by the European Patent Office in counterpart European Application No. 12843295.2.
Communication dated Mar. 8, 2017, issued by the Intellectual Property Office of the Philippines in counterpart Filipino Application No. 1-2016-502377.

(56) References Cited

OTHER PUBLICATIONS

Communication Dated Mar. 8, 2017, issued by the Intellectual Property Office of the Philippines in counterpart Filipino Application No. 1-2016-502376.
Communication Dated Mar. 8, 2017, issued by the Intellectual Property Office of the Philippines in counterpart Filipino Application No. 1-2016-502375.
Communication Dated Mar. 8, 2017, issued by the Intellectual Property Office of the Philippines in counterpart Filipino Application No. 1-2016-502374.
Communication dated Jul. 24, 2017 issued by Mexico Patent Office in counterpart Mexican Application No. MX/a/2015/008270.
Communication issued by the Federal Service for Intellectual Property dated Feb. 19, 2018 in counterpart Russian Patent Application No. 2017114021.
Notice of Allowance dated Nov. 27, 2018 by the Taiwan Intellectual Property Office in counterpart Taiwanese Patent Application No. 106128503.
Office Action dated Jan. 11, 2019 by the India Intellectual Property Office in counterpart Indian Patent Application No. 940/MUMNP/2014.
Communication dated Aug. 2, 2019, issued by the State Intellectual Property Office of P.R. China in counterpart Chinese Application No. 201710585081.X.
Communication dated Aug. 22, 2019, issued by the Indonesian Patent Office in Indonesian Patent Application No. P00201701064.
Communication dated Aug. 27, 2019, issued by the Indonesian Patent Office in Indonesian Patent Application No. P00201701067.

FIG. 7
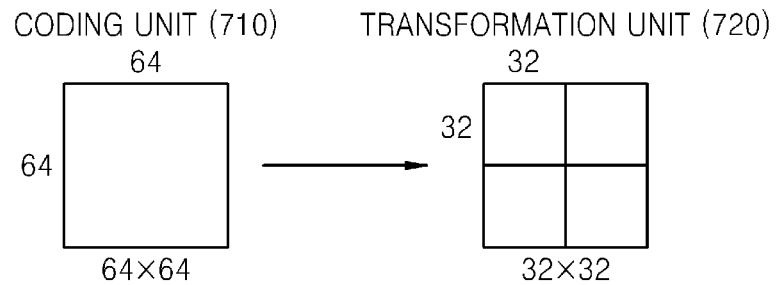
FIG. 8
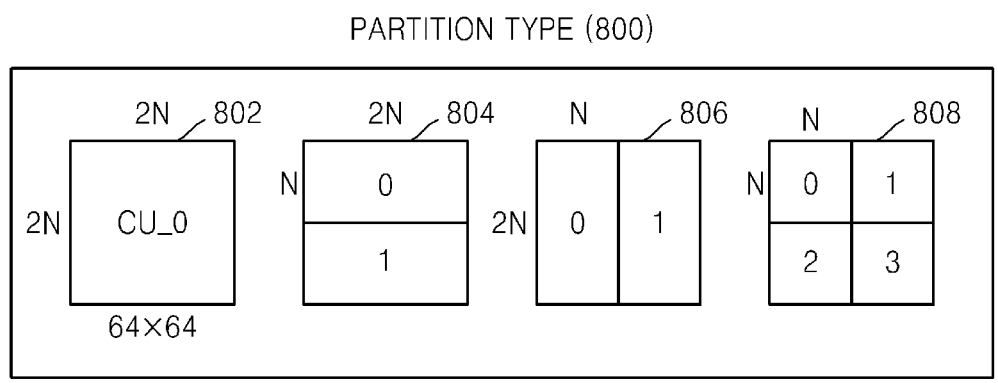
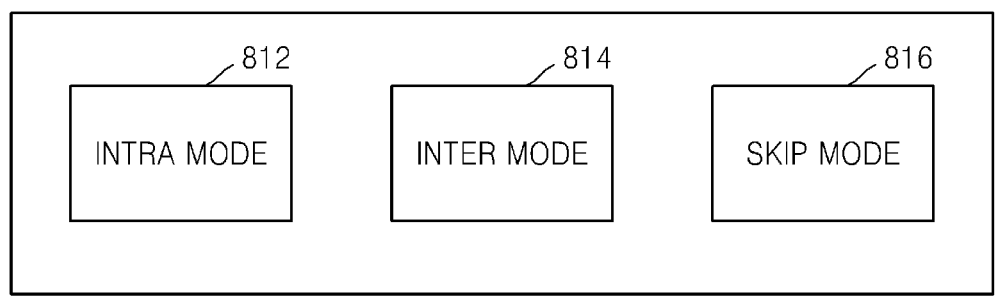
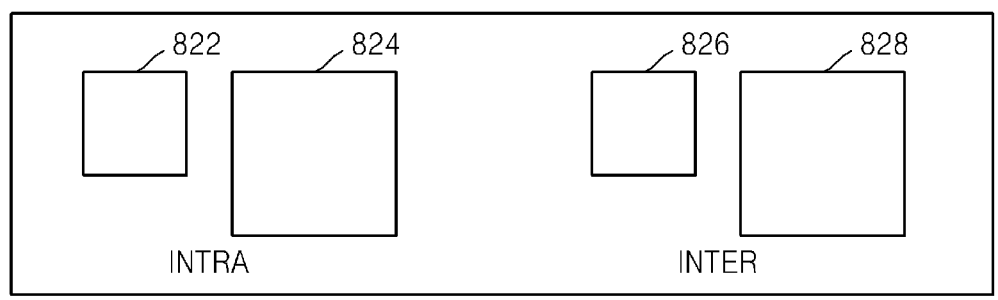

CODING UNIT (1010)

FIG. 14

| SIZE OF CODING UNIT | NUMBER OF PREDICTION MODES | | |
|---|---|---|---|
| | Example 1 | Example 2 | Example 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

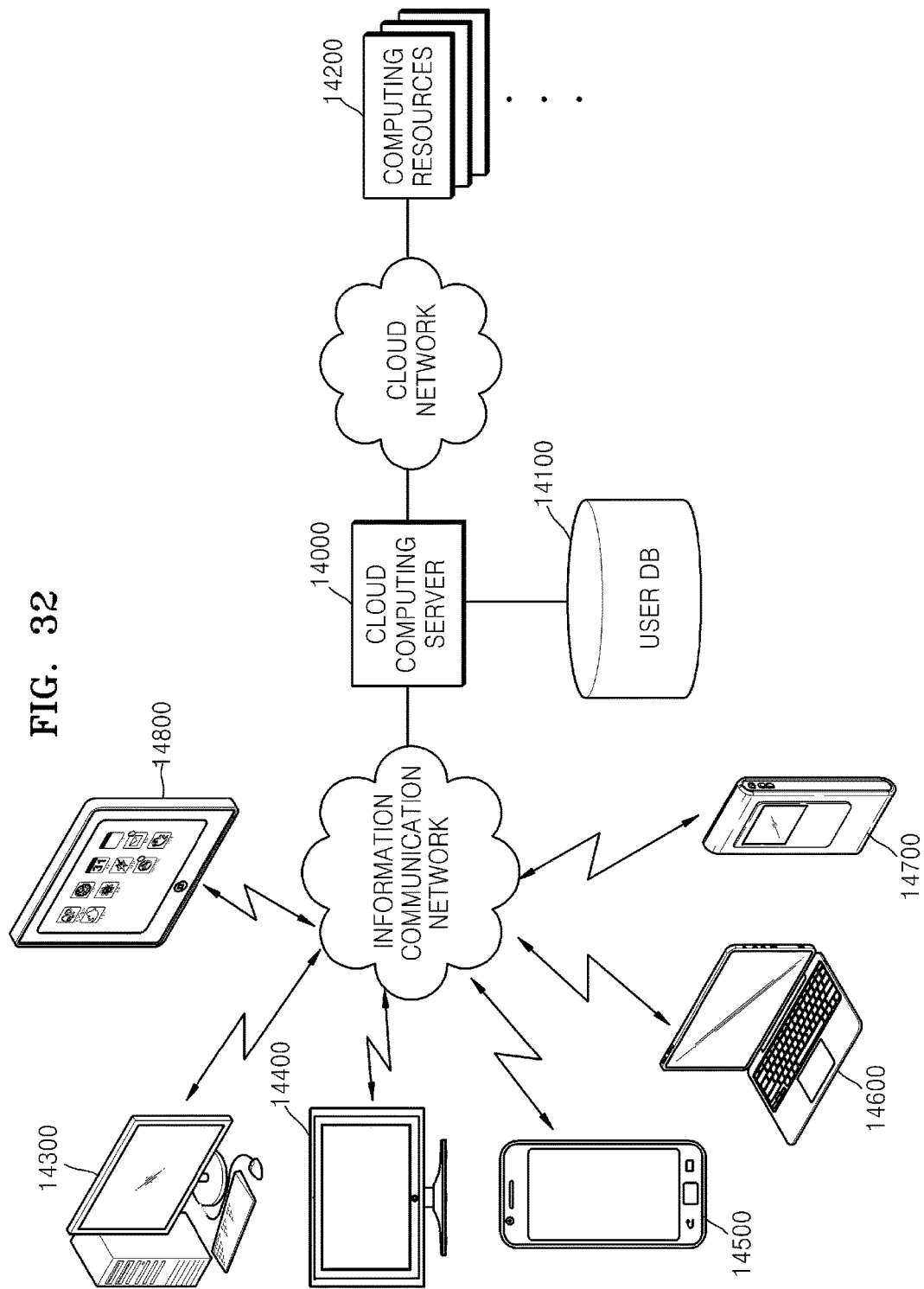

METHOD AND DEVICE FOR INTRA PREDICTION VIDEO

CROSS-REFERENCE TO RELATED APPLICATIONS

This application is a Continuation of U.S. application Ser. No. 15/851,228 filed on Dec. 21, 2017, in the U.S. Patent and Trademark Office, which is a Continuation of U.S. application Ser. No. 15/352,103 filed on Nov. 15, 2016, in the U.S. Patent and Trademark Office, now U.S. Pat. No. 9,883,191, issued on Jan. 30, 2018, which is a Continuation of U.S. application Ser. No. 14/354,722, filed on Apr. 28, 2014, now U.S. Pat. No. 9,621,918, issued on Apr. 11, 2017, which is a National Stage Entry of International Application No. PCT/KR2012/008938 filed on Oct. 29, 2012, which claims the benefit of U.S. Provisional Application No. 61/552,692, filed on Oct. 28, 2011, in the U.S. Patent and Trademark Office the disclosures of which are incorporated herein by reference in their entireties.

1. FIELD

The present invention relates to intra prediction of a video, and more particularly, to a method and apparatus for intra prediction of a video, which involves replacing an adjacent pixel unavailable in a limited intra prediction mode that limits a use of an adjacent pixel, and using the replaced adjacent pixel as a reference pixel.

2. BACKGROUND

In an image compression method, such as Moving Picture Experts Group (MPEG)-1, MPEG-2, MPEG-4, or H.264/MPEG-4 Advanced Video Coding (AVC), a picture is divided into macroblocks in order to encode an image. Each of the macroblocks is encoded in all encoding modes that can be used in inter prediction or intra prediction, and then is encoded in an encoding mode that is selected according to a bit rate used to encode the macroblock and a distortion degree between a decoded macroblock and the original macroblock.

As hardware for reproducing and storing high resolution or high quality video content is being developed and supplied, there is an increasing need for a video codec capable of effectively encoding or decoding the high resolution or high quality video content. In a conventional video codec, a video is encoded in units of macroblocks each having a predetermined size.

SUMMARY

The present invention provides a method of replacing an adjacent pixel unavailable in a limited intra prediction mode that limits a use of an adjacent pixel used in intra prediction.

Method for intra predicting video determines availability of a predetermined number of adjacent pixels used for intra prediction, if an unavailable first adjacent pixel exists, searches for a second adjacent pixel that is available by searching a predetermined number of adjacent pixels in a predetermined direction based on the first adjacent pixel, and replaces a pixel value of the first adjacent pixel with a pixel value of a found second adjacent pixel. For an unavailable third adjacent pixel, a replacement process is performed by using an adjacent pixel in a predetermined direction.

According to one or more embodiments of the present invention, the complexity of a process of determining a reference pixel used for intra prediction may be reduced by searching for and replacing an available adjacent pixel, based on a predetermined search direction, with an unavailable adjacent pixel.

BRIEF DESCRIPTION OF THE DRAWINGS

FIG. 7 is a diagram for describing a relationship between a coding unit and transformation units, according to an embodiment of the present invention;

FIG. 8 is a diagram for describing encoding information of coding units corresponding to a coded depth, according to an embodiment of the present invention;

FIG. 14 is a table showing a number of intra prediction modes according to a size of a prediction unit, according to an embodiment of the present invention;

FIG. 32 illustrates a network structure of a cloud computing system using a video encoding apparatus and a video decoding apparatus, according to an embodiment of the present invention.

DETAILED DESCRIPTION

Figure 1:
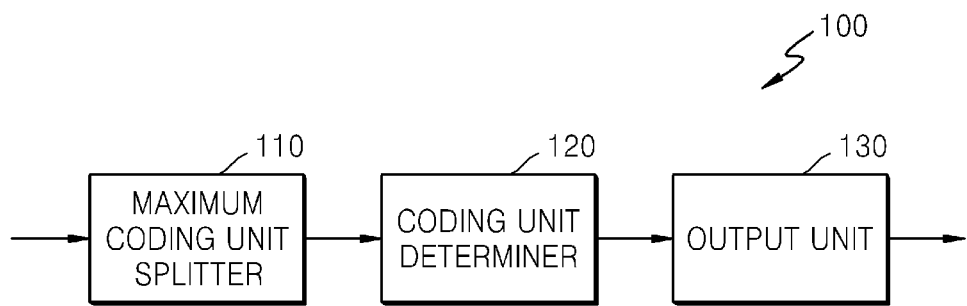
FIG. 1 is a block diagram of an apparatus for encoding a video, according to an embodiment of the present invention.

According to an aspect of the present invention, there is provided a method of intra predicting a video, the method comprising: determining availability of a predetermined number of adjacent pixels used for intra prediction of a current block from among blocks obtained by splitting a picture forming the video according to a hierarchical structure; if a first adjacent pixel is unavailable in the predetermined number of adjacent pixels, searching for a second adjacent pixel that is available by searching the predetermined number of adjacent pixels in a predetermined direction based on the first adjacent pixel; replacing a pixel value of the first adjacent pixel with a pixel value of a found second adjacent pixel; and performing intra prediction on the current block by using the predetermined number of adjacent pixels comprising the replaced first adjacent pixel.

The determining of the availability comprises determining adjacent pixels, which are included in adjacent block that is inter predicted or that belongs to a different slice from a slice to which the current block belongs, to be unavailable.

The first adjacent pixel can be a pixel at a predetermined location from among the predetermined number of adjacent pixels, and the searching for the second adjacent pixel can comprise determining an available adjacent pixel, which was initially found by searching the predetermined number of adjacent pixels in the predetermined direction based on the first adjacent pixel, to be the second adjacent pixel.

The first adjacent pixel can be an adjacent pixel located at an upper left corner of the current block, and the searching for the second adjacent pixel can comprise searching for the second adjacent pixel by searching top and upper right adjacent pixels of the current block from left to right based on the first adjacent pixel, and if a second adjacent pixel is unavailable in the top and upper right adjacent pixels of the current block, searching left and lower left adjacent pixels of the current block from top to bottom based on the first adjacent pixel.

The first adjacent pixel can be an adjacent pixel located at an upper left corner of the current block, and the searching for the second adjacent pixel can comprise searching for the second adjacent pixel by searching left and lower left adjacent pixels of the current block from top to bottom based on the first adjacent pixel, and if a second adjacent pixel is unavailable in the left and lower left adjacent pixels of the current block, searching top and upper right adjacent pixels of the current block from left to right based on the first adjacent pixel.

The first adjacent pixel can be an adjacent pixel located at an upper left corner of the current block, and the searching for the second adjacent pixel can comprise determining an available left adjacent pixel by searching left and lower left adjacent pixels of the current block from top to bottom based on the first adjacent pixel, and determining an available top adjacent pixel by searching top and upper right adjacent pixels of the current block from left to right based on the first adjacent pixel; and replacing the pixel value of the first adjacent pixel by using an average value of the available left adjacent pixel and the available top adjacent pixel.

The first adjacent pixel can be an adjacent pixel located at an upper left corner of the current block, and the searching for the second adjacent pixel can comprise determining an available left adjacent pixel by searching left and lower left adjacent pixels of the current block from top to bottom based on the first adjacent pixel, determining an available top adjacent pixel by searching top and upper right adjacent pixels of the current block from left to right based on the first adjacent pixel, and determining an adjacent pixel, which is closer to the first adjacent pixel from among the searched left and top adjacent pixels, to be the second adjacent pixel.

The first adjacent pixel can be a lowermost left adjacent pixel from among left and lower left adjacent pixels of the current block, and the searching for the second adjacent pixel can comprise searching for the second adjacent pixel by searching left and lower left adjacent pixels of the current block from bottom to top based on the first adjacent pixel, and if a second adjacent pixel is unavailable in the left and lower left adjacent pixels of the current block, searching top and upper right adjacent pixels of the current block from left to right.

The first adjacent pixel can be an upper rightmost adjacent pixel from among top and upper right adjacent pixels of the current block, and the searching for the second adjacent pixel can comprise searching for the second adjacent pixel by searching top and upper right adjacent pixels of the current block from right to left based on the first adjacent pixel, and if a second adjacent pixel is unavailable in the top and upper right adjacent pixels of the current block, searching left and lower left adjacent pixels of the current block from top to bottom.

The method can further comprise, if at least one third adjacent pixel is unavailable, replacing a pixel value of the at least one third adjacent pixel with a pixel value of an adjacent pixel previously searched for based on the predetermined direction.

The first adjacent pixel can be an adjacent pixel located at an upper left corner of the current block, and if the at least one third adjacent pixel is located at a top of the current block, the method can further comprise sequentially replacing the at least one third adjacent pixel from a leftmost third adjacent pixel with an adjacent pixel to the left of the at least one third adjacent pixel, and if the at least one third adjacent pixel is located to the left of the current block, sequentially replacing the at least one third adjacent pixel from a topmost third adjacent pixel with an adjacent pixel above the at least one third adjacent pixel.

The first adjacent pixel can be an adjacent pixel located at a lowermost left corner of the current block, and if the at least one third adjacent pixel is located to the left of the current block, the method can further comprise sequentially replacing the at least one third adjacent pixel from a bottommost third adjacent pixel with an adjacent pixel below the at least one third adjacent pixel, and if the at least one third adjacent pixel is located at a top of the current block, sequentially replacing the at least one third adjacent pixel from a leftmost third adjacent pixel with an adjacent pixel to the left of the at least one third adjacent pixel.

The first adjacent pixel can be an adjacent pixel located at an upper rightmost corner of the current block, and if the at least one third adjacent pixel is located at a top of the current block, the method can further comprise sequentially replacing the at least one third adjacent pixel from a rightmost third adjacent pixel with an adjacent pixel to the right of the at least one third adjacent pixel, and if the at least one third adjacent pixel is located to the left of the current block, sequentially replacing the at least one third adjacent pixel from a topmost third adjacent pixel with an adjacent pixel above the at least one third adjacent pixel.

The method can further comprise replacing the pixel value of the first adjacent pixel with a predetermined value if the second adjacent pixel does not exist in the predetermined number of adjacent pixels.

The predetermined value may be determined based on a bit depth of a pixel.

According to another aspect of the present invention, there is provided an apparatus for intra predicting a video, the apparatus comprising: an availability determiner for determining availability of a predetermined number of adjacent pixels used for intra prediction of a current block from among blocks obtained by splitting a picture forming the video according to a hierarchical structure; a replacer for, if a first adjacent pixel is unavailable in the predetermined number of adjacent pixels, searching for a second adjacent pixel that is available by searching the predetermined number of adjacent pixels in a predetermined direction based on the first adjacent pixel, and replacing a pixel value of the first adjacent pixel with a pixel value of a found second adjacent pixel; and an intra prediction performer for performing intra prediction on the current block by using the predetermined number of adjacent pixels comprising the replaced first adjacent pixel.

Hereinafter, the present invention will be described more fully with reference to the accompanying drawings, in which exemplary embodiments of the invention are shown.

FIG. 1 is a block diagram of a video encoding apparatus 100, according to an embodiment of the present invention.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an embodiment of the present invention may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an embodiment of the present invention may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment of the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an embodiment of the present invention include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment of the present invention is an index related to the number of splitting times from a maximum coding unit to a minimum coding unit. A first maximum depth according to an embodiment of the present invention may denote the total number of splitting times from the maximum coding unit to the minimum coding unit. A second maximum depth according to an embodiment of the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is thus N×N, and may be 2 when the size of the transformation unit is thus N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to embodiments of the present invention, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an embodiment of the present invention is a square data unit obtained by splitting the minimum coding unit constituting the lowermost depth by 4. Alternatively, the minimum unit may be a maximum square data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
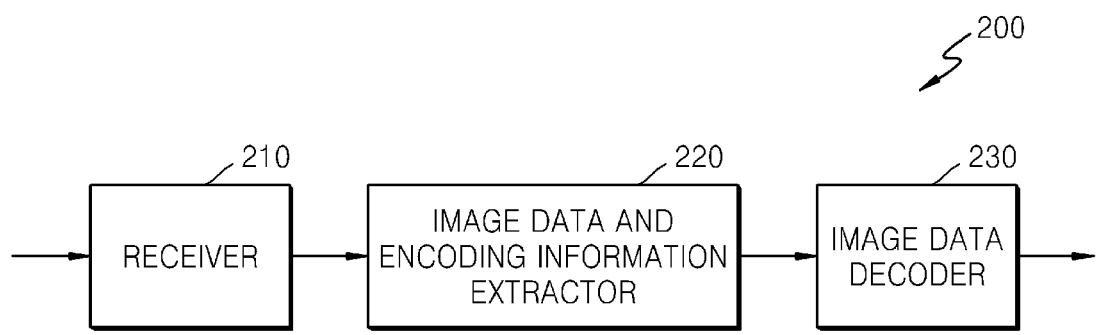
FIG. 2 is a block diagram of an apparatus for decoding a video, according to an embodiment of the present invention.

FIG. 2 is a block diagram of a video decoding apparatus 200, according to an embodiment of the present invention.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an embodiment of the present invention, will now be described with reference to FIGS. 3 through 13.

Figure 3:
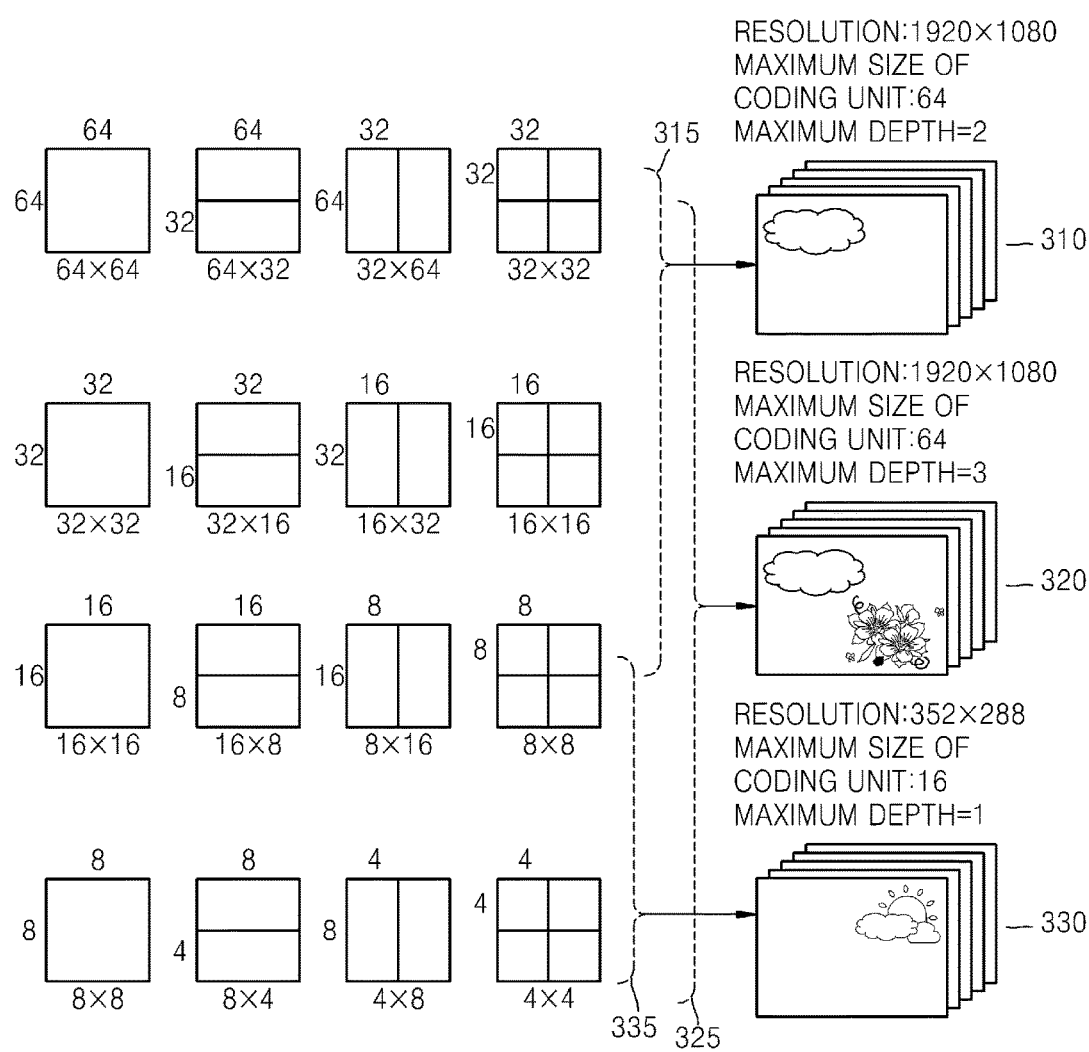
FIG. 3 is a diagram for describing a concept of coding units according to an embodiment of the present invention.

FIG. 3 is a diagram for describing a concept of coding units according to an embodiment of the present invention.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
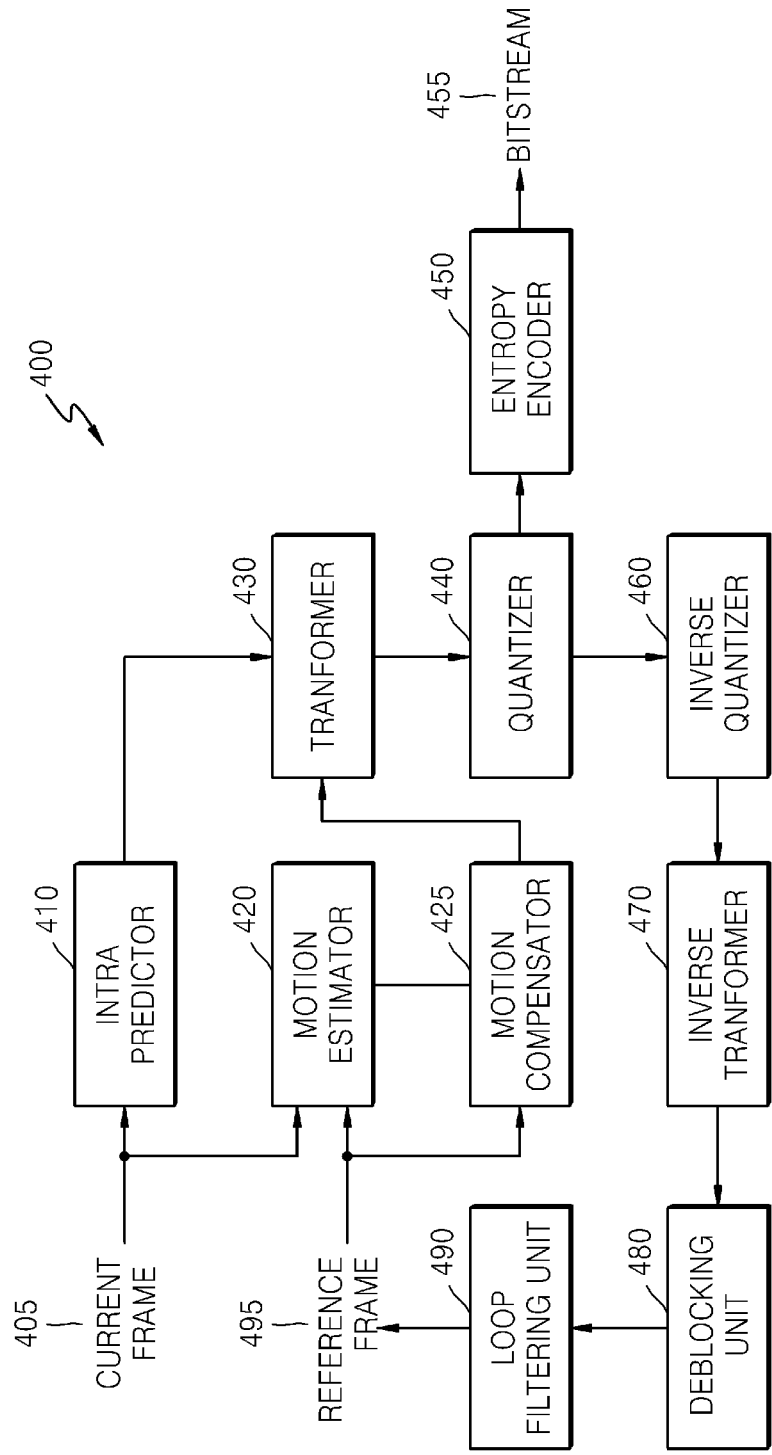
FIG. 4 is a block diagram of an image encoder based on coding units according to an embodiment of the present invention.

FIG. 4 is a block diagram of an image encoder 400 based on coding units, according to an embodiment of the present invention.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
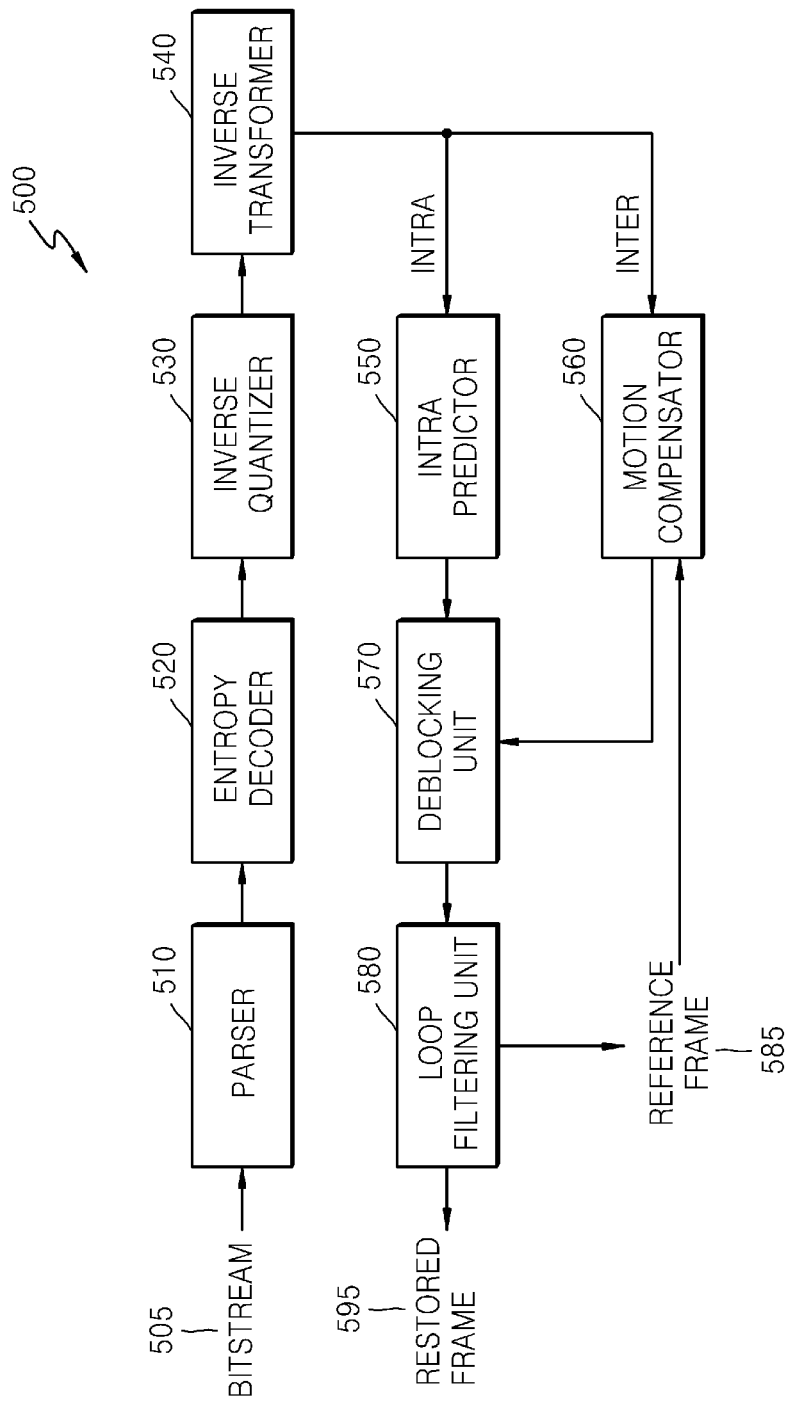
FIG. 5 is a block diagram of an image decoder based on coding units according to an embodiment of the present invention.

FIG. 5 is a block diagram of an image decoder 500 based on coding units, according to an embodiment of the present invention.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
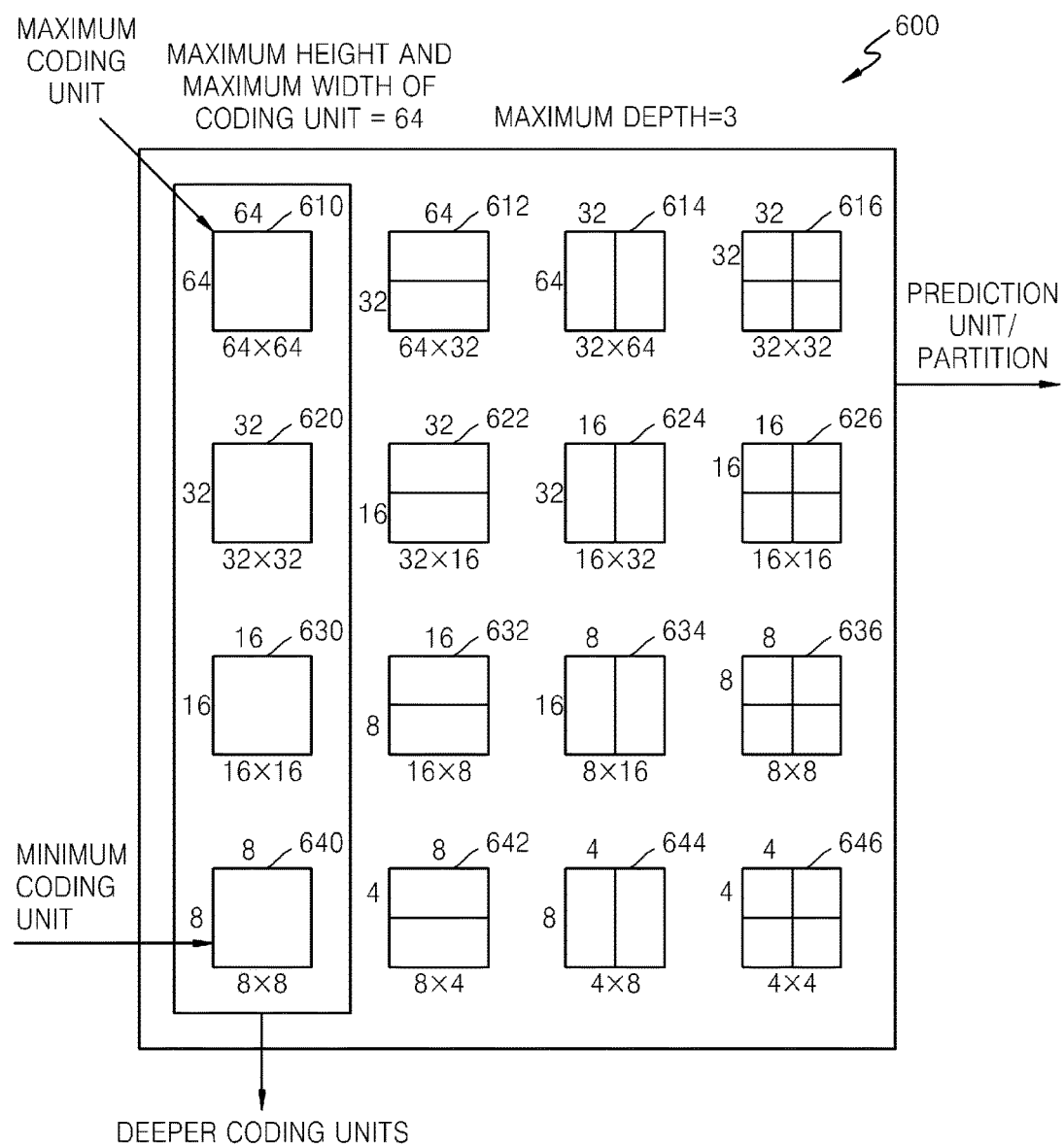
FIG. 6 is a diagram illustrating deeper coding units according to depths, and partitions according to an embodiment of the present invention.

FIG. 6 is a diagram illustrating deeper coding units according to depths, and partitions, according to an embodiment of the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an embodiment of the present invention, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an embodiment of the present invention.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an embodiment of the present invention.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
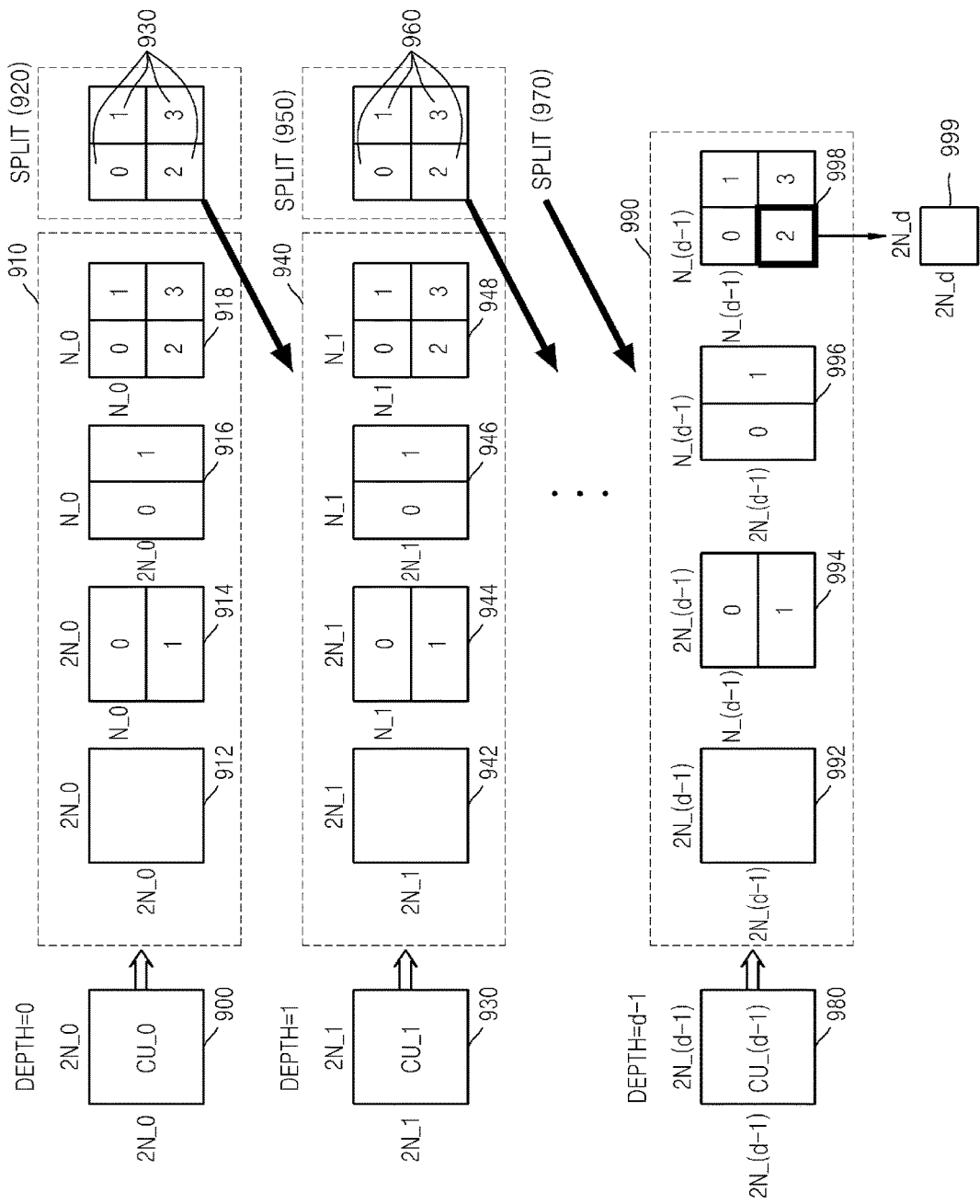
FIG. 9 is a diagram of deeper coding units according to depths, according to an embodiment of the present invention.

FIG. 9 is a diagram of deeper coding units according to depths, according to an embodiment of the present invention.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an embodiment of the present invention may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
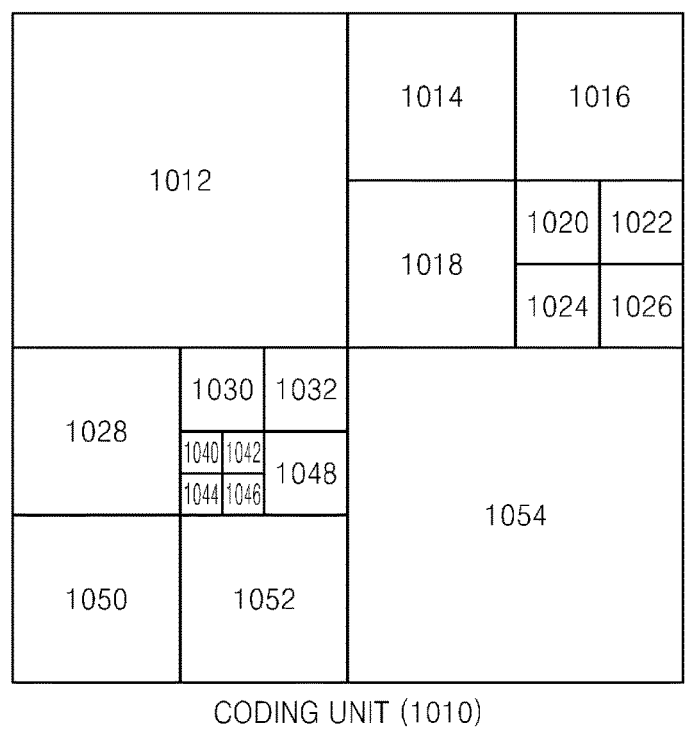
FIGS. 10 through 12 are diagrams for describing a relationship between coding units, prediction units, and transformation units, according to an embodiment of the present invention.
Figure 11:
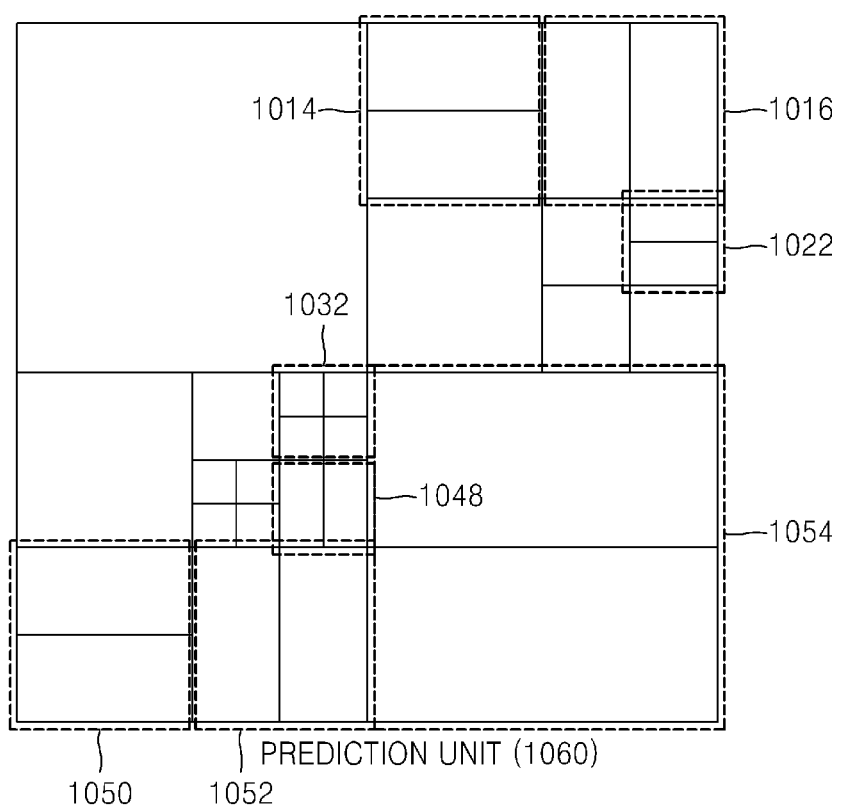
Figure 12:
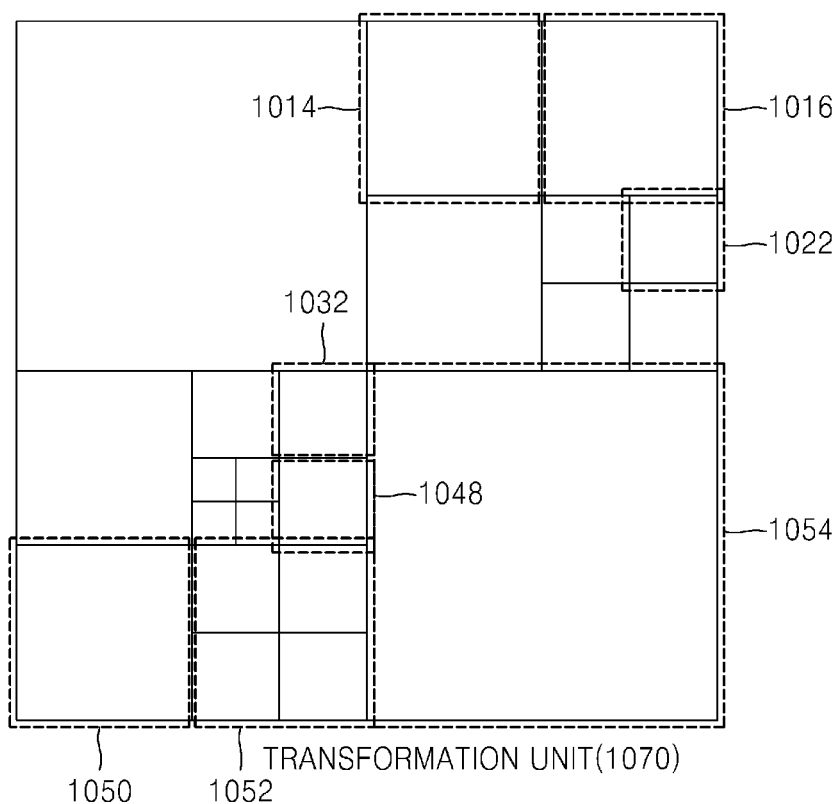

FIGS. 10 through 12 are diagrams for describing a relationship between coding units 1010, prediction units 1060, and transformation units 1070, according to an embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| Intra Inter Skip (Only 2N × 2N) | Symmetrical Partition Type | Asymmetrical Partition Type | Split Information 0 of Transformation Unit | Split Information 1 of Transformation Unit | Repeatedly Encode Coding Units having Lower Depth of d + 1 |
| | 2N × 2N | 2N × nU | 2N × 2N | N × N (Symmetrical Type) | |
| | 2N × N | 2N × nD | | | |
| | N × 2N | nL × 2N | | N/2 × N/2 (Asymmetrical Type) | |
| | N × N | nR × 2N | | | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
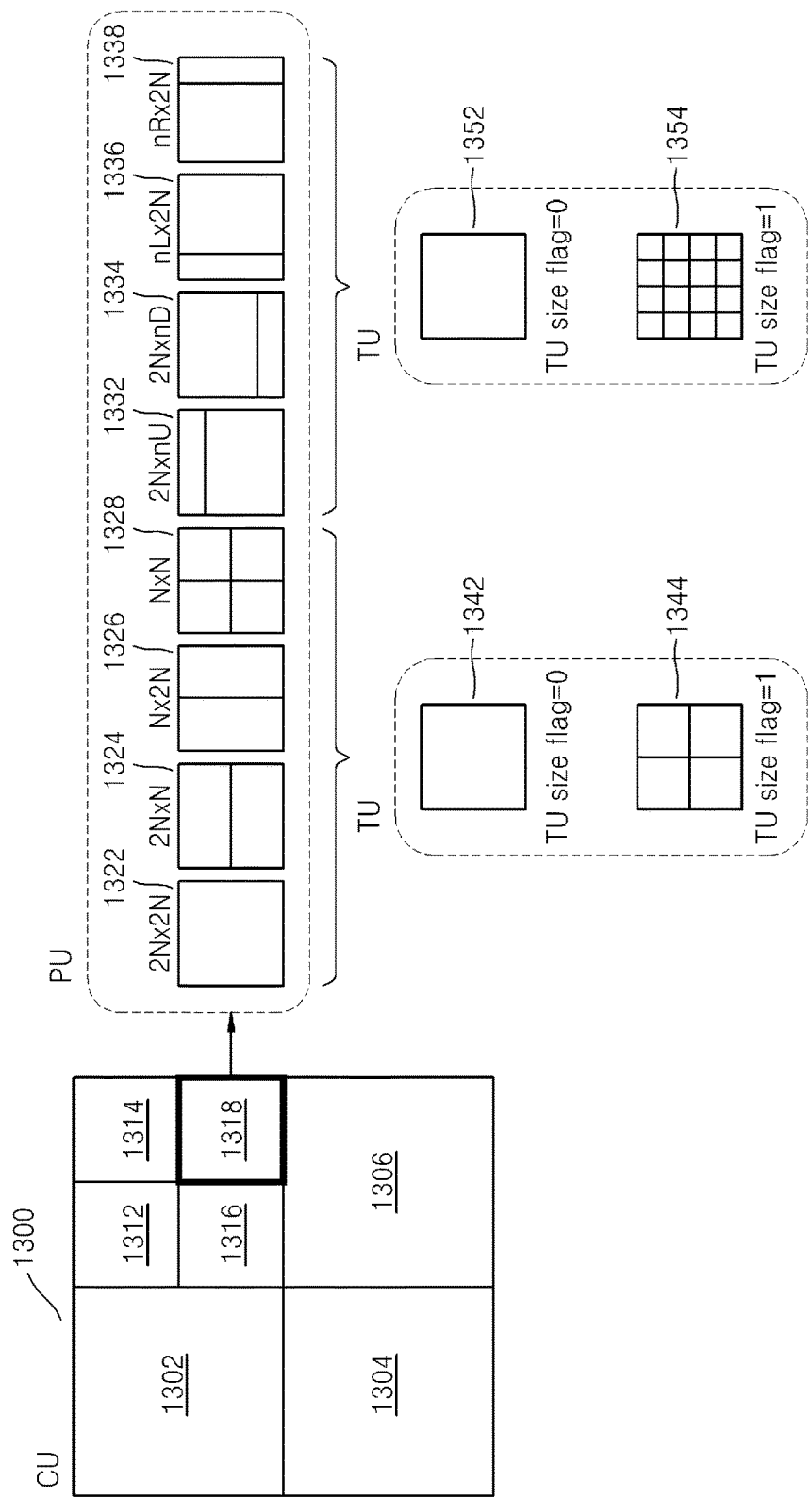
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, intra prediction performed on a prediction unit by the intra predictor 410 of the video encoding apparatus 100 of FIG. 4 and the intra predictor 550 of the video decoding apparatus 200 of FIG. 5 will be described in detail.

The intra predictors 410 and 550 perform intra prediction for obtaining a prediction value of a current prediction unit by using adjacent pixels of the current prediction unit. Considering that a prediction unit has a size equal to or higher than 16×16, the intra predictors 410 and 550 additionally performs an intra prediction mode having various directivities using a (dx, dy) parameter as well as an intra prediction mode having a limited directivity according to a related art. The intra prediction mode having various directivities according to an embodiment of the present invention will be described later in detail.

FIG. 14 is a table showing a number of intra prediction modes according to a size of a prediction unit, according to an embodiment of the present invention.

The intra predictors 410 and 550 may variously set the number of intra prediction modes to be applied to the prediction unit according to the size of the prediction unit. For example, referring to FIG. 14, when the size of the prediction unit to be intra predicted is N×N, the numbers of intra prediction modes actually performed on the prediction units having the sizes of 2×2, 4×4, 8×8, 16×16, 32×32, 64×64, and 128×128 may be respectively set to 5, 9, 9, 17, 33, 5, and 5 in Example 2. The number of intra prediction modes actually performed differs according to the size of the prediction unit because overhead for encoding prediction mode information differs according to the size of the prediction unit. In other words, even though a portion of a prediction unit occupying an entire image is small, overhead for transmitting additional information, such as a prediction mode of such a small prediction unit may be large. Accordingly, when a prediction unit having a small size is encoded in many prediction modes, an amount of bits may increase and thus compression efficiency may decrease. Also, since a prediction unit having a large size, for example, a prediction unit having a size equal to or larger than 64×64, is generally mostly selected as a prediction unit of a flat region of an image, it may be insufficient in terms of compression efficiency to encode the prediction unit having a large size, which is mostly selected to encode a flat region, in many prediction modes. Accordingly, when a size of prediction unit is too large or too small compared to a predetermined size, a relatively small number of intra prediction modes may be applied. However, the number of intra prediction modes applied according to the size of a prediction unit is not limited to FIG. 14, and may vary. The number of intra prediction modes applied according to the size of a prediction unit, as shown in FIG. 14, is only an example, and may vary. Alternatively, the number of intra prediction modes applied to the prediction unit may be always uniform regardless of the size of a prediction unit.

The intra predictors 410 and 550 may include, as an intra prediction mode applied to a prediction unit, an intra prediction mode that determines an adjacent reference pixel by using a line having a predetermined angle based on a pixel in a prediction unit and using the determined adjacent reference pixel as a predictor of the pixel. The angle of such a line may be set by using a parameter (dx, dy), wherein dx and dy are each an integer. For example, when 33 prediction modes are respectively defined to be modes N, wherein N is an integer from 0 to 32, a mode 0 is set to a vertical mode, a mode 1 is set to a horizontal mode, a mode 2 is set to a DC mode, a mode 3 is set to a plane mode, and a mode 32 is set to a planar mode. Also, modes 4 through 31 may be defined to be intra prediction modes determining an adjacent reference pixel by using a line having a directivity of $\tan^{-1}(dy/dx)$ using (dx, dy) respectively expressed by (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) of Table 1, and using the determined adjacent reference pixel for intra prediction.

TABLE 2

| mode # | dx | dy |
|---|---|---|
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 | mode 0 is vertical mode, mode 1 is horizontal mode, mode 2 is DC mode, mode 3 is plane mode, and mode 32 is planar mode.

The number of intra prediction modes used by the intra predictors 410 and 550 is not limited to Table 2, and may vary based on whether a current prediction unit is a chrominance component or luminance component or based on a size of current prediction unit. Also, each mode N may denote an intra prediction mode different from above. For example, the number of intra prediction modes may be 36, wherein a mode 0 is a planar mode described later, a mode 1 is a DC mode, modes 2 through 34 are intra prediction modes having 33 directivities as described later, and a mode 35 is an intra prediction mode Intra_FromLuma using a prediction unit in a luminance component corresponding to a prediction unit in a chrominance component. The mode 35, i.e., the intra prediction mode Intra_FromLuma using the prediction unit in the luminance component corresponding to the prediction unit in the chrominance component is only applied to the prediction unit in the chrominance component, and is not used to intra predict the prediction unit in the luminance component.

Figure 15:
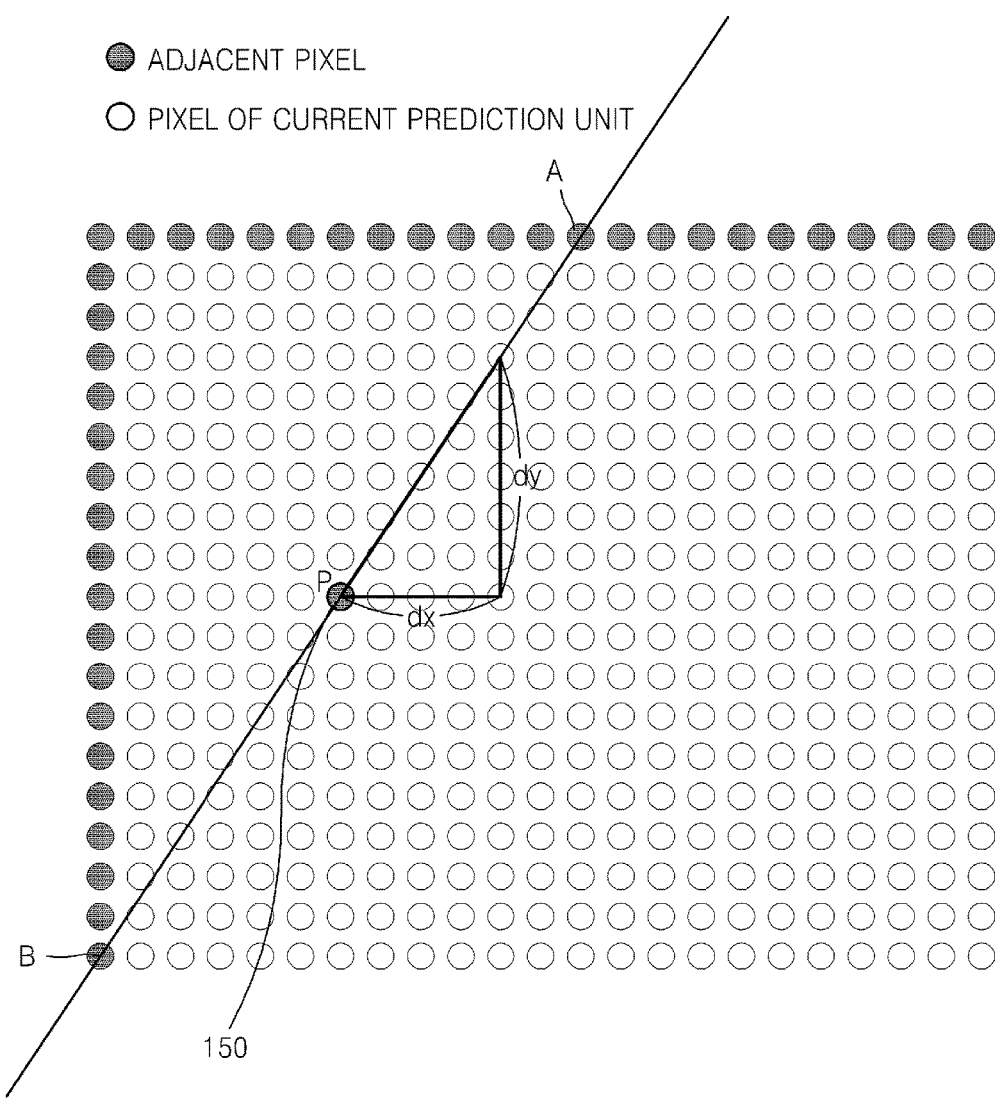
FIG. 15 is a reference diagram for describing intra prediction modes having various directivities, according to an embodiment of the present invention.

FIG. 15 is a reference diagram for describing intra prediction modes having various directivities, according to an embodiment of the present invention.

As described above, the intra predictors 410 and 550 may determine an adjacent reference pixel by using a line having an angle of $\tan^{-1}(dy/dx)$ determined by a plurality of (dx, dy) parameters, and perform intra prediction by using the determined adjacent reference pixel.

Referring to FIG. 15, adjacent pixels A and B located on an extension line 150 having an angle of $\tan^{-1}(dy/dx)$ determined according to a value of (dx, dy) according to the intra prediction modes of Table 2 based on a current pixel P to be predicted in a current prediction unit may be used as predictors of the current pixel P. Here, an adjacent pixel used as a predictor may be a pixel of a previous prediction unit that is pre-encoded and pre-restored and is located either above, left, upper right, or lower left of a current prediction unit. As such, by performing prediction encoding according to intra prediction modes having various directivities, compression may be effectively performed according to characteristics of an image.

In FIG. 15, when a predictor of the current pixel P is generated by using an adjacent pixel located on or near the extension line 150, the extension line 150 actually has a directivity of $\tan^{-1}(dy/dx)$ and a division of (dy/dx) is required to determine the adjacent pixel using the extension line 150, and thus hardware or software may include a decimal point operation, thereby increasing a throughput. Accordingly, when a prediction direction for selecting a reference pixel is set by using (dx, dy) parameters, dx and dy may be set to decrease a throughput.

Figure 16:
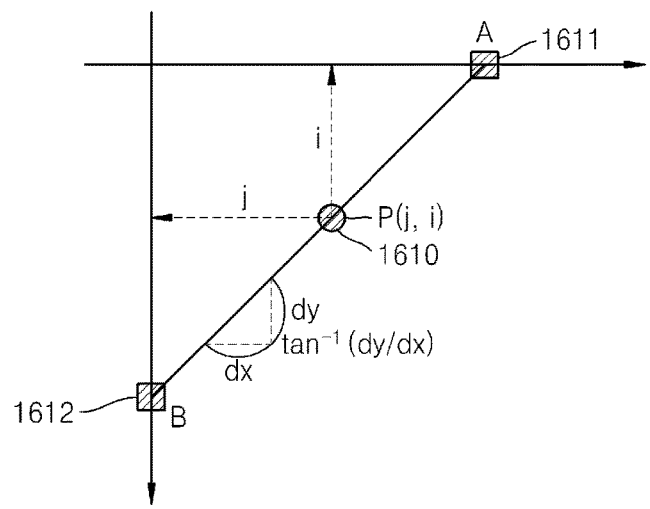
FIG. 16 is a diagram for describing a relationship between a current pixel and adjacent pixels disposed on an extension line having a directivity of (dx, dy), according to an embodiment of the present invention.

FIG. 16 is a diagram for describing a relationship between a current pixel and adjacent pixels disposed on an extension line having a directivity of (dx, dy), according to an embodiment of the present invention.

Referring to FIG. 16, P 1610 denotes the current pixel located at (j, i) and A 1611 and B 1612 respectively denote an adjacent upper pixel and an adjacent left pixel located on an extension line having a directivity, i.e., an angle of $\tan^{-1}(dy/dx)$, passing through the current pixel P 1610. It is assumed that a size of a prediction unit including the current pixel P 1610 is nS×nS wherein nS is a positive integer, a location of pixel of the prediction unit is one of (0, 0) to (nS−1, nS−1), a location of the adjacent upper pixel A 1611 on an x-axis is (m, −1) wherein m is an integer, and a location of the adjacent left pixel B 1612 on an y-axis is (−1, n) wherein n is an integer. The location of the adjacent upper pixel A 1611 meeting the extension line passing through the current pixel P1610 is (j+i*dx/dy, −1), and the location of the adjacent left pixel B 1612 is (−1, i+j*dy/dx). Accordingly, in order to determine the adjacent upper pixel A 1611 or adjacent left pixel B 1612 to predict the current pixel P1610, a division operation, such as dx/dy or dy/dx is required. As described above, since operation complexity of the division operation is high, an operation speed in software or hardware may be low. Accordingly, at least one of dx and dy indicating a directivity of a prediction mode for determining an adjacent pixel may be a power of 2. In other words, when n and m are each an integer, dx and dy may be respectively 2^n and 2^m.

When the adjacent left pixel B 1612 is used as a predictor of the current pixel P 1610 and dx has a value of 2^n, an j*dy/dx operation required to determine (−1, i+j*dy/dx), i.e., a location of the adjacent left pixel B 1612, may be (i*dy)/(2^n) and a division operation using a power of 2 may be realized via a shift operation, such as (i*dy)>>n, and thus a throughput is decreased.

Similarly, when the adjacent upper pixel A 1611 is used as a predictor of the current pixel P 1610 and dy has a value of 2^m, an i*dx/dy operation required to determine (j+i*dx/dy,−1), i.e., a location of the adjacent upper pixel A 1611 may be (i*dx)/(2^m) and a division operation using a power of 2 may be realized via a shift operation, such as (i*dx)>>m.

Figure 17:
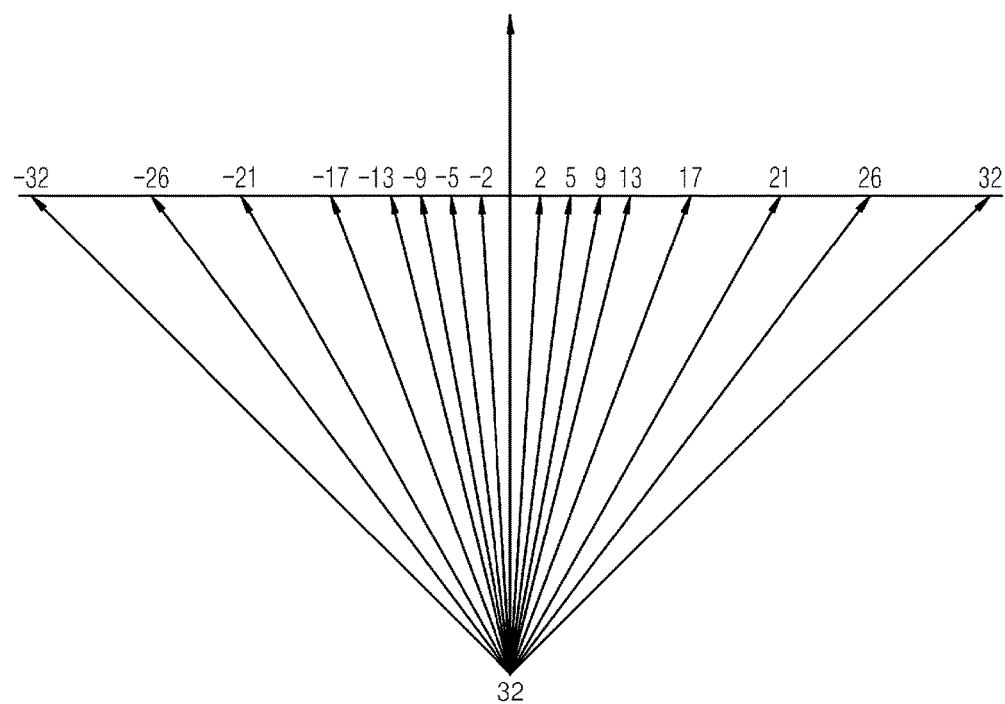
FIGS. 17 and 18 are diagrams showing directions of an intra prediction mode, according to embodiments of the present invention.
Figure 18:
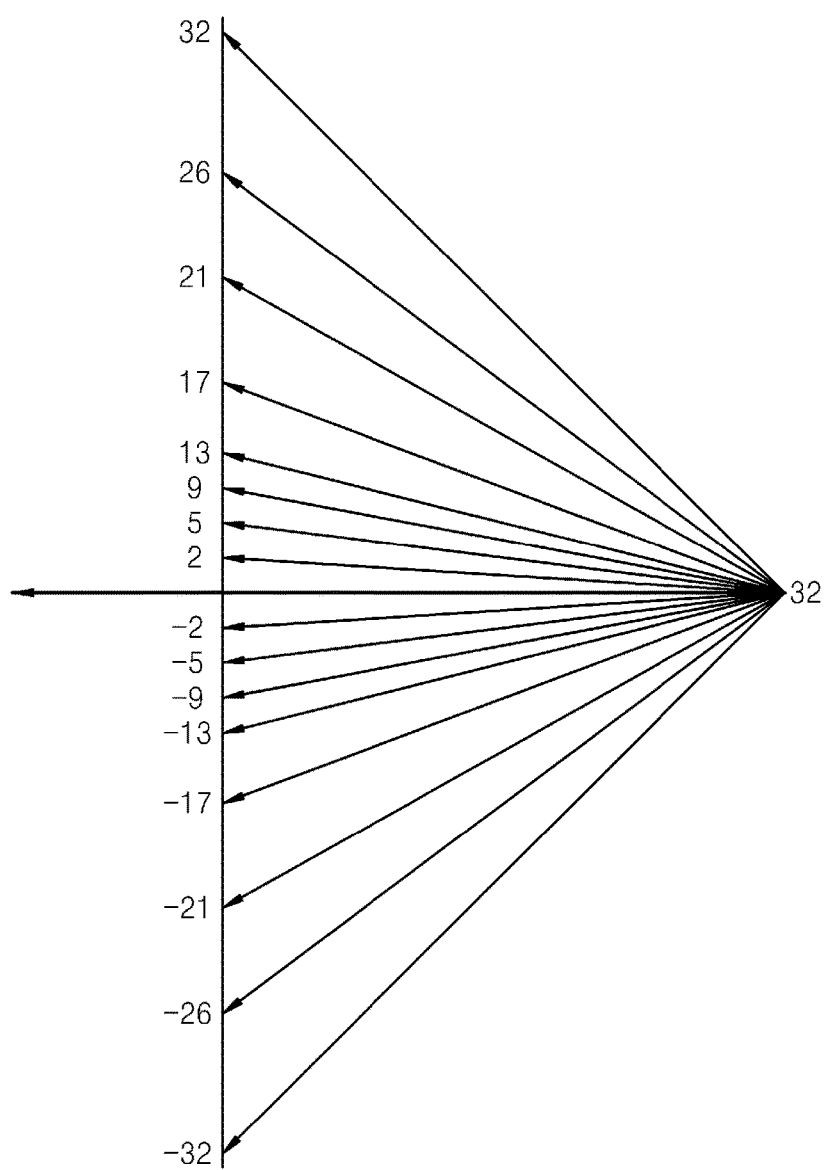

FIGS. 17 and 18 are diagrams showing directions of an intra prediction mode, according to embodiments of the present invention.

Generally, straight line patterns shown in an image or video signal are mostly vertical or horizontal. Thus, when an intra prediction mode having various directivities is defined by using a (dx, dy) parameter, values of dx and dy may be defined as follows to improve encoding efficiency of an image.

In detail, when dy has a fixed value of 2^m, an absolute value of dx may be set such that an interval between prediction directions close to a vertical direction is narrow and an interval between prediction modes increases towards a prediction direction close to a horizontal direction. For example, referring to FIG. 17, when dy is 2^5, i.e., 32, dx may be set to 2, 5, 9, 13, 17, 21, 26, 32, −2, −5, −9, −13, −17, −21, −26, and −32 such that an interval between prediction directions close to a vertical direction is relatively narrow and an interval between prediction modes increases towards a prediction direction close to a horizontal direction.

Similarly, when dx has a fixed value of 2^n, an absolute value of dy may be set such that an interval between prediction directions close to a horizontal direction is narrow and an interval between prediction modes increases towards a prediction direction close to a horizontal direction. For example, referring to FIG. 18, when dx is 2^5, i.e., 32, dy may be set to 2, 5, 9, 13, 17, 21, 26, 32, −2, −5, −9, −13, −17, −21, −26, and −32 such that an interval between prediction directions close to a horizontal direction is relatively narrow and an interval between prediction modes increase towards a prediction direction close to a vertical direction.

Also, when one of values of dx and dy is fixed, the other value may be set such as to increase according to prediction modes. For example, when the value of dy is fixed, an interval between values of dx may be set to increase by a predetermined value. Such an increment may be set according to angles divided between a horizontal direction and a vertical direction. For example, when dy is fixed, dx may have an increment a in a section where an angle with a vertical axis is smaller than 15°, an increment b in a section where the angle is between 15° and 30°, and an increment c in a section where the angle is higher than 30°.

For example, prediction modes having directivities of tan^−1(dy/dx) using (dx, dy) may be defined by (dx, dy) parameters shown in Tables 3 through 5.

TABLE 3

| dx  | dy | dx | dy  | dx | dy |
|-----|----|----|-----|----|----|
| −32 | 32 | 21 | 32  | 32 | 13 |
| −26 | 32 | 26 | 32  | 32 | 17 |
| −21 | 32 | 32 | 32  | 32 | 21 |
| −17 | 32 | 32 | −26 | 32 | 26 |
| −13 | 32 | 32 | −21 | 32 | 32 |
| −9  | 32 | 32 | −17 |    |    |
| −5  | 32 | 32 | −13 |    |    |
| −2  | 32 | 32 | −9  |    |    |
| 0   | 32 | 32 | −5  |    |    |
| 2   | 32 | 32 | −2  |    |    |
| 5   | 32 | 32 | 0   |    |    |
| 9   | 32 | 32 | 2   |    |    |
| 13  | 32 | 32 | 5   |    |    |
| 17  | 32 | 32 | 9   |    |    |

TABLE 4

| dx  | dy | dx | dy  | dx | dy |
|-----|----|----|-----|----|----|
| −32 | 32 | 19 | 32  | 32 | 10 |
| −25 | 32 | 25 | 32  | 32 | 14 |
| −19 | 32 | 32 | 32  | 32 | 19 |
| −14 | 32 | 32 | −25 | 32 | 25 |
| −10 | 32 | 32 | −19 | 32 | 32 |
| −6  | 32 | 32 | −14 |    |    |
| −3  | 32 | 32 | −10 |    |    |
| −1  | 32 | 32 | −6  |    |    |
| 0   | 32 | 32 | −3  |    |    |
| 1   | 32 | 32 | −1  |    |    |
| 3   | 32 | 32 | 0   |    |    |
| 6   | 32 | 32 | 1   |    |    |
| 10  | 32 | 32 | 3   |    |    |
| 14  | 32 | 32 | 6   |    |    |

TABLE 5

| dx  | dy | dx | dy  | dx | dy |
|-----|----|----|-----|----|----|
| −32 | 32 | 23 | 32  | 32 | 15 |
| −27 | 32 | 27 | 32  | 32 | 19 |
| −23 | 32 | 32 | 32  | 32 | 23 |
| −19 | 32 | 32 | −27 | 32 | 27 |
| −15 | 32 | 32 | −23 | 32 | 32 |
| −11 | 32 | 32 | −19 |    |    |
| −7  | 32 | 32 | −15 |    |    |
| −3  | 32 | 32 | −11 |    |    |
| 0   | 32 | 32 | −7  |    |    |
| 3   | 32 | 32 | −3  |    |    |
| 7   | 32 | 32 | 0   |    |    |
| 11  | 32 | 32 | 3   |    |    |
| 15  | 32 | 32 | 7   |    |    |
| 19  | 32 | 32 | 11  |    |    |

As described above, the intra prediction modes using (dx, dy) parameters use the adjacent left pixel (−1, i+j*dy/dx) or the adjacent upper pixel (j+i*dx/dy,−1) as a predictor of a pixel located at (j,i). When at least one of dx and dy has a power of 2 as shown in Table 2, locations of the adjacent left pixel (−1, i+j*dy/dx) and adjacent upper pixel (j+i*dx/dy,−1) may be obtained via only multiplication and shift operations without a division operation. When dx is 2^n, i.e., 32, in (dx, dy) as shown in Table 2, a division operation using dx may be replaced by a right shift operation, and thus a location of an adjacent left pixel may be obtained without a division operation based on (i*dy)>>n. Similarly, when dy is 2^m, i.e., 32, in (dx, dy) as shown in Table 2, a division operation using dx may be replaced by a right shift operation, and thus a location of an adjacent upper pixel may be obtained without a division operation based on (i*dx)>>m.

Figure 19:
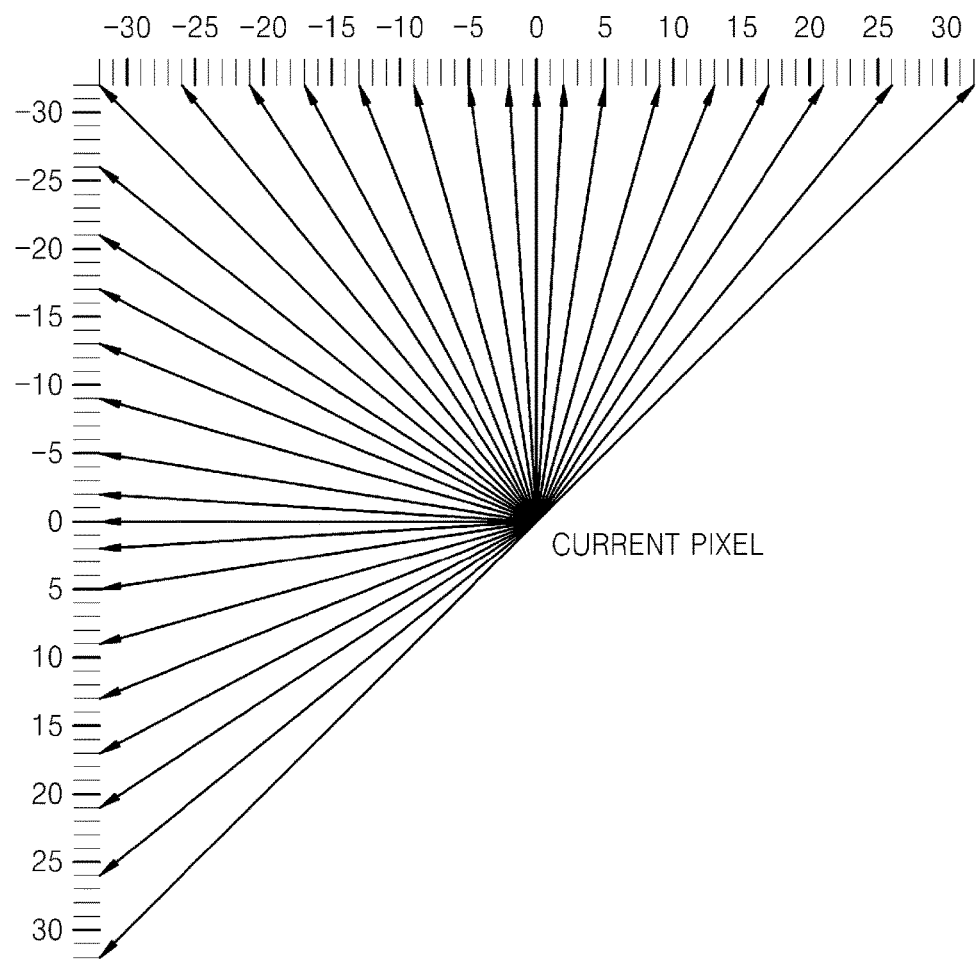
FIG. 19 is a diagram showing directions of an intra prediction mode having 33 directivities, according to an embodiment of the present invention.

FIG. 19 is a diagram showing directions of an intra prediction mode having 33 directivities, according to an embodiment of the present invention.

The intra predictors 410 and 550 may determine an adjacent pixel to be used as a predictor of a current pixel according to intra prediction modes having 33 directivities shown in FIG. 19. As described above, directions of intra prediction modes may be set such that an interval between prediction modes decreases towards a horizontal or vertical direction and increases farther from a vertical or horizontal direction.

Meanwhile, use of adjacent pixels used as reference pixels of a current block may be limited according to the intra prediction modes having various directivities as described with reference to FIG. 19. For example, use of an adjacent pixel included in an inter block predicted via inter prediction may be limited during intra prediction of the current block. As such, the use of the adjacent pixel included in the inter block is limited so as to prevent propagation of an error included in the inter block. Also, use of an adjacent block included in a different slice from that of the current block that is intra predicted may be limited during intra prediction of the current block. The use of the adjacent block included in the different slice is limited because use of data of the adjacent block included in the different slice may be limited as reference data of the current block since image data is encapsulated and independently processed in a slice unit according to a general image process. Accordingly, the intra predictors 410 and 550 may determine whether to use an adjacent pixel for intra prediction of the current block based on a prediction mode of an adjacent block including the adjacent pixel or based on whether a slice including the adjacent block is same with a slice including the current block. The intra predictor 410 of the image encoder 400 may set a value of a flag (constrained_intra_pred_flag) indicating whether to use an adjacent pixel included in an inter block for intra prediction of a current block, and then add the constrained_intra_pred_flag to an encoded bitstream so as to signal a limitation of a use of the adjacent pixel included in the inter block. For example, when the value of constrained_intra_pred_flag is 0, the adjacent pixel is used for the intra prediction of the current block regardless of a prediction mode of an adjacent block. When the value of constrained_intra_pred_flag is 1, the use of the adjacent pixel included in the inter block may be limited during the intra prediction of the current block. Alternatively, the intra predictors 410 and 550 may limit a pixel of an adjacent block included in a different slice from that of the current block to never be used for the intra prediction of the current block.

Hereinafter, assuming that the value of constrained_intra_pred_flag is 1, i.e., the use of the adjacent block included in the inter block, as a reference pixel, is limited during the intra prediction of the current block, a process of the intra predictors 410 and 550 replacing an adjacent pixel having limited use as a reference pixel with another adjacent pixel is described in detail with reference to FIGS. 20 through 26. Also, it is assumed that the use of the pixel of the adjacent block included in the different slice from that of the current block is always limited during the intra prediction of the current block.

Figure 24:
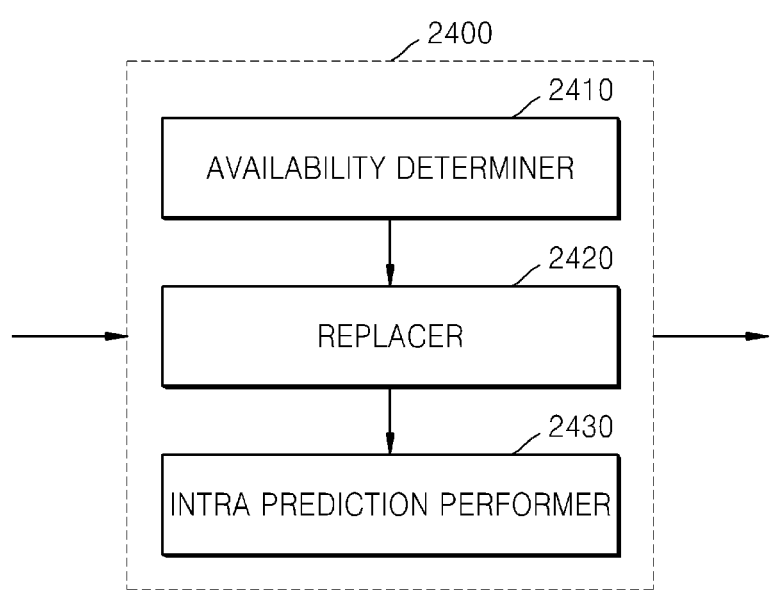
FIG. 24 is a block diagram of an intra prediction apparatus according to an embodiment of the present invention.

FIG. 24 is a block diagram of an intra prediction apparatus 2400 according to an embodiment of the present invention. The intra prediction apparatus 2400 of FIG. 24 corresponds to the intra predictors 410 and 550 of FIGS. 4 and 5.

Referring to FIG. 24, the intra prediction apparatus 2400 includes an availability determiner 2410, a replacer 2420, and an intra prediction performer 2430.

The availability determiner 2410 determines availability of a predetermined number of adjacent pixels used for intra prediction of a current block. Here, availability indicates whether an adjacent pixel is usable for the intra prediction as a reference pixel of the current block. As described above, since the value of constrained_intra_pred_flag is assumed to be 1, it is determined that an adjacent pixel included in an adjacent block included in a different slice from a slice including the current block or an inter-predicted adjacent block is not available. Accordingly, the availability determiner 2410 determines whether the predetermined number of adjacent pixels of the current block includes the adjacent pixel included in the adjacent block included in the different slice from the slice including the current block or whether the predetermined number of adjacent pixels of the current block includes the adjacent pixel included in the inter-predicted adjacent block. The predetermined number of adjacent pixels may be set according to any standard. For example, when a size of the current block is nT×nT, wherein nT is an integer, availability may be determined on a total of 4nT+1 adjacent pixels including 2nT upper adjacent pixels located at the top and upper right of the current block, 2nT left adjacent pixels located at the left and lower left of the current block and one adjacent pixel located at an upper left corner of the current block. However, a number and locations of adjacent pixels whose availability is determined may vary.

If the adjacent pixels are all determined to be available, the intra prediction performer 2430 of an encoder uses the adjacent pixel as a reference pixel so as to generate a prediction block of the current block by performing intra prediction according to the intra prediction mode having the various directivities as shown in FIG. 19. The intra prediction performer 2430 of a decoder generates the prediction block of the current block by performing the intra prediction on the current block by using the adjacent pixel based on an intra prediction mode of the current block extracted from a bitstream.

If the adjacent pixels are all determined to be unavailable, the replacer 2420 may replace a pixel value of an unavailable adjacent pixel with a predetermined value. Here, the predetermined value may be a value determined based on a bit depth of a pixel. The bit depth of the pixel is a bit number used to express a pixel value of one pixel, and may be 8 to 14 bits. As such, a variable bit depth BitDepth may be represented by an equation; BitDepth=BaseBitDepth+Increased_bit_depth, through a base bit depth BaseBitDepth and a variable increasement of bit depth increased_bit_depth. If the bit depth is in the range from 8 to 14 bits as described above, the base bit depth BaseBitDepth has a value of 8 and the increasement of bit depth increased_bit_depth has a value from 0 to 6. If the adjacent pixels are all unavailable, the replacer 2420 may replace all values of the adjacent pixels with a value of 1<<((BitDepth)−1). For example, when the bit depth BitDepth is 8, the replacer 2420 may replace all values of the adjacent pixels to have a pixel value of 1<<(8−1), i.e., 128, that is 1×2^7, if the adjacent pixels are all unavailable.

If it is determined by the availability determiner 2410 that not all of the predetermined number of adjacent pixels are unavailable but at least one adjacent pixel is unavailable, the replacer 2420 searches for an available adjacent pixel by searching the predetermined number of adjacent pixels in a predetermined direction based on the unavailable adjacent pixel, and replaces a pixel value of the unavailable adjacent pixel with a pixel value of a found available adjacent pixel. A process of replacing the unavailable adjacent pixel will be described below with reference to FIGS. 20 through 23.

When the unavailable adjacent pixel is replaced with the available adjacent pixel, the intra prediction performer 2430 performs intra prediction on the current block by using the replaced adjacent pixel and the available adjacent pixels, and generates a prediction block of the current block.

Hereinafter, a process of replacing an unavailable adjacent pixel during intra prediction of a current block will be described in detail with reference to FIGS. 20 through 23.

Figure 20:
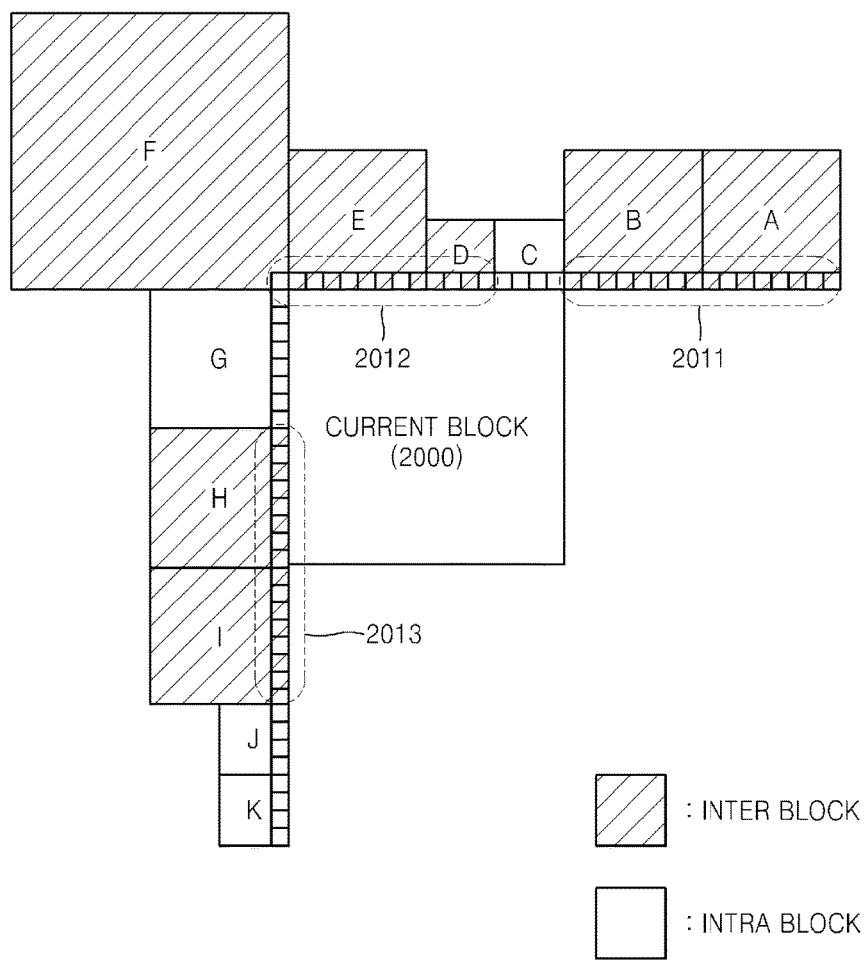
FIG. 20 is a diagram of an adjacent pixel that is unavailable during intra prediction of a current block according to a type of an adjacent block, according to an embodiment of the present invention.

FIG. 20 is a diagram of an adjacent pixel that is unavailable during intra prediction of a current block 2000 according to a type of an adjacent block, according to an embodiment of the present invention.

Referring to FIG. 20, when a size of the current block 2000 is nT×nT, the availability determiner 2410 determines whether adjacent blocks A, B, C, D, and E including 2nT top adjacent pixels located at the top and upper right of the current block 2000 are inter blocks or are blocks included in a different slice from a slice including the current block 2000. Also, the availability determiner 2410 determines whether adjacent blocks G, H, I, J, and K including 2nT left adjacent pixels located at the left and lower left of the current block 2000 and an adjacent block F including one adjacent pixel located at an upper left corner of the current block 2000 are inter blocks or blocks included in a different slice from the slice including the current block 2000.

The availability determiner 2410 determines an adjacent pixel included in an inter block or a block included in the different slice from among the adjacent blocks A through K to be an unavailable adjacent pixel. In FIG. 20, since the adjacent blocks A, B, D, E, F, H, and I are inter-predicted inter blocks, the availability determiner 2410 determines adjacent pixels 2011, 2012, and 2013 included in the adjacent blocks A, B, D, E, F, H, and I to be unavailable adjacent pixels. As described above, the replacer 2420 searches for an available adjacent pixel in a predetermined direction based on the unavailable adjacent pixel and replaces a pixel value of the unavailable adjacent pixel with a pixel value of the found available adjacent pixel.

In detail, the availability determiner 2410 according to an embodiment first determines availability of an adjacent pixel (hereinafter, referred to as a first adjacent pixel) at a predetermined location from among adjacent pixels. If the first adjacent pixel is not available, the replacer 2420 searches for a second adjacent pixel that is available by searching adjacent pixels in a predetermined direction. Also, the replacer 2420 replaces the first adjacent pixel with the found second adjacent pixel.

A remaining unavailable adjacent pixel (hereinafter, referred to as a third adjacent pixel) excluding the first adjacent pixel is previously processed and replaced based on a predetermined direction or is replaced with an original available adjacent pixel. The unavailable third adjacent pixels are sequentially replaced according to a search order used to search for the second adjacent pixel. When the first adjacent pixel is available, a process of replacing the first adjacent pixel is skipped, and only a process of replacing the third adjacent pixel is performed.

Figure 21:
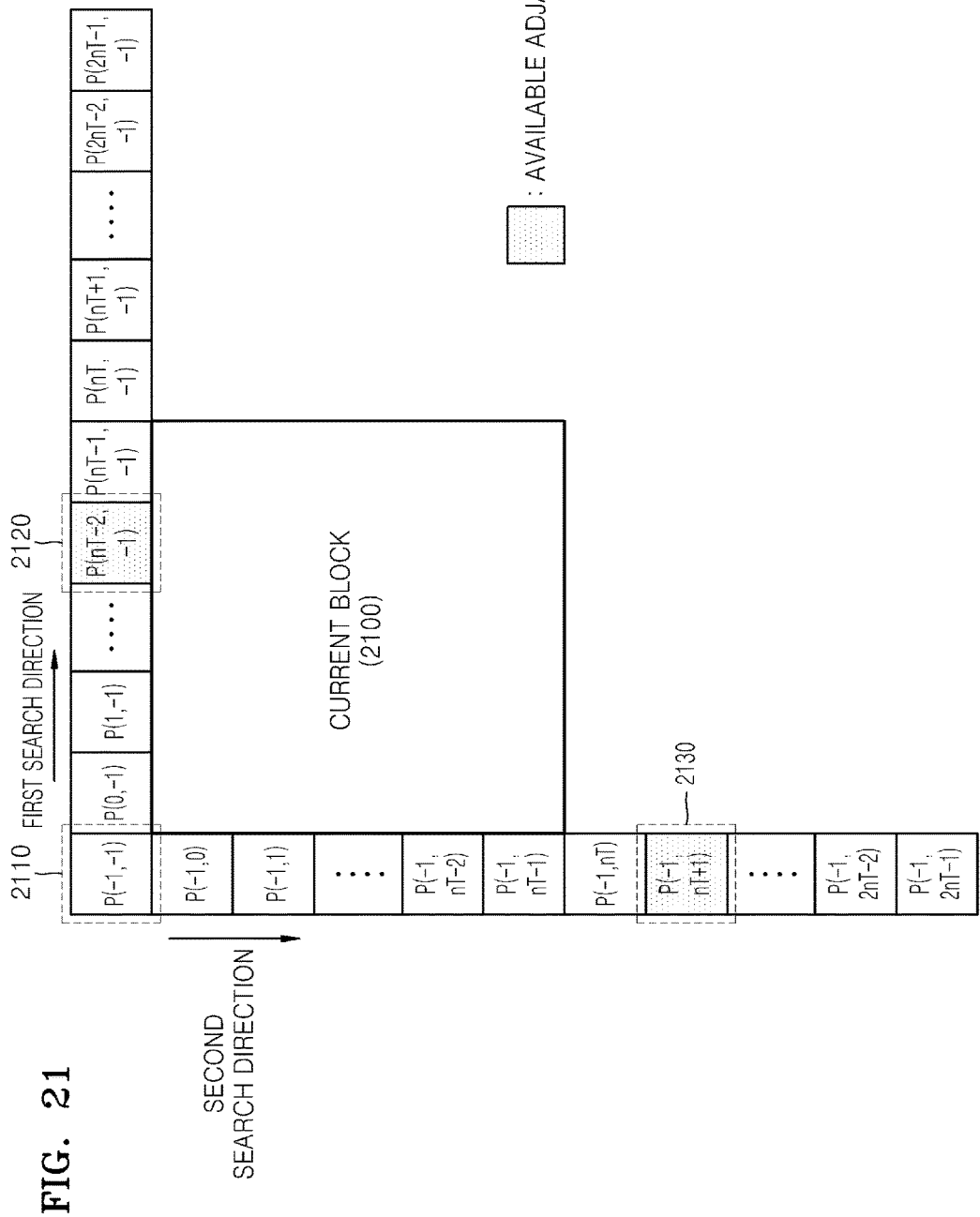
FIG. 21 is a diagram for describing a process of replacing an unavailable adjacent pixel, according to an embodiment of the present invention.
Figure 22:
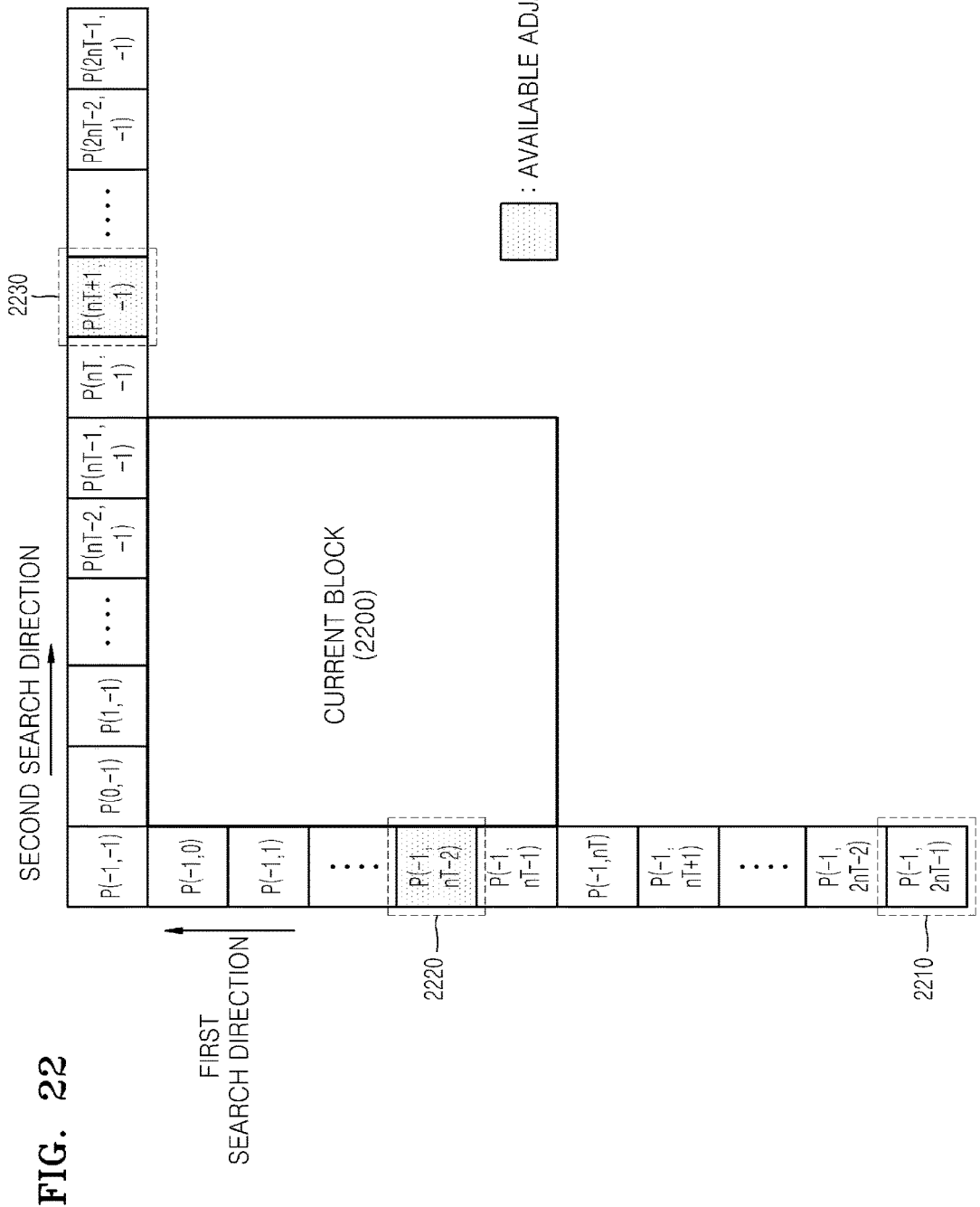
FIG. 22 is a diagram for describing a process of replacing an unavailable adjacent pixel, according to another embodiment of the present invention.
Figure 23:
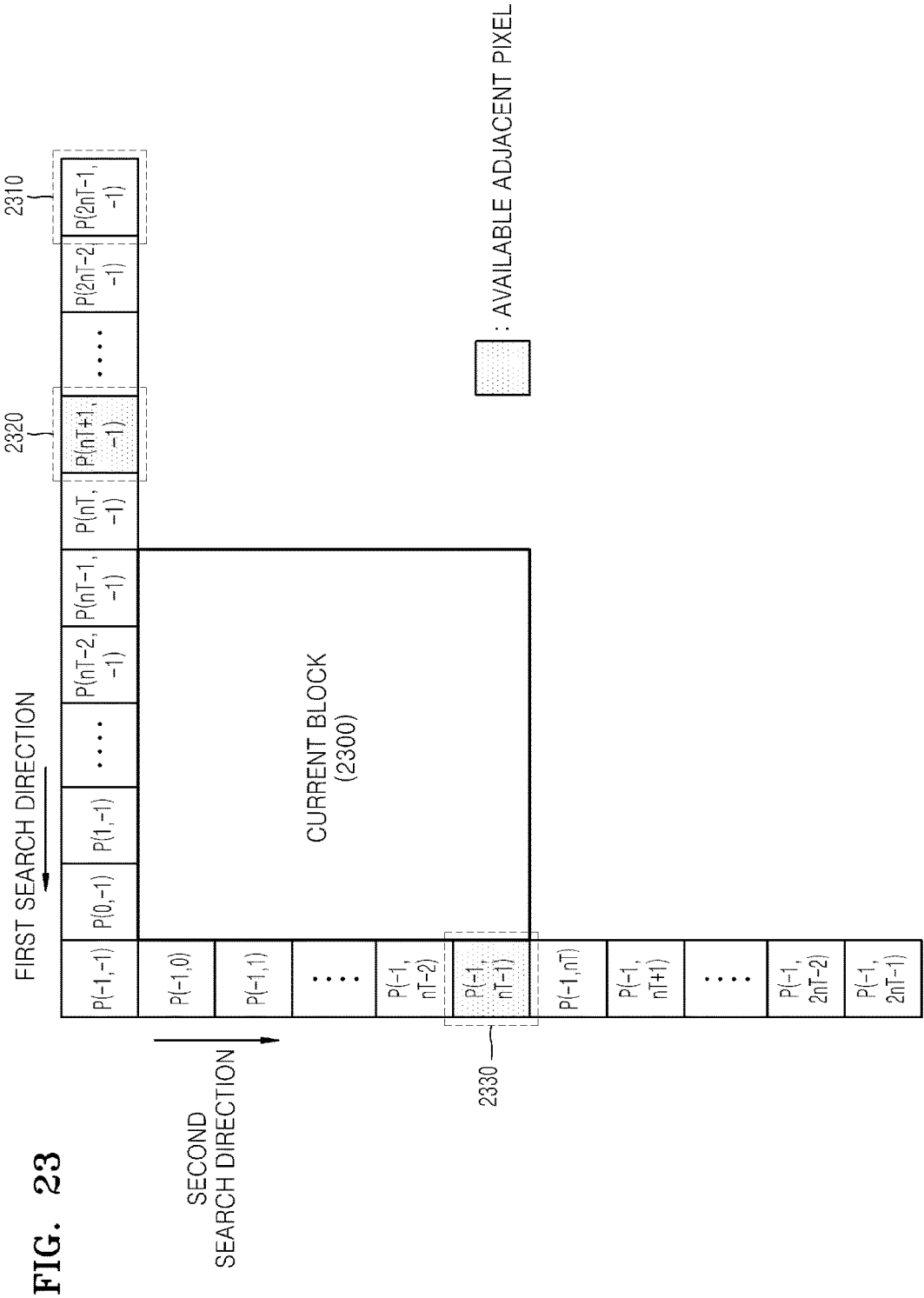
FIG. 23 is a diagram for describing a process of replacing an unavailable adjacent pixel, according to another embodiment of the present invention.

Hereinafter, it is assumed that sizes of current blocks 2100, 2200, and 2300 of FIGS. 21 through 23 are nT×nT, and P(x,y) denotes an adjacent pixel whose availability is determined for intra prediction of the current blocks 2100, 2200, and 2300, wherein x=−1, y=−1, . . . 2nT−1 and x=0, . . . , 2nT−1, y=−1.

FIG. 21 is a diagram for describing a process of replacing an unavailable adjacent pixel, according to an embodiment of the present invention.

Referring to FIG. 21, a first adjacent pixel whose availability is first determined from among adjacent pixels is assumed to be an adjacent pixel P(−1,−1) 2110 located at an upper left corner of the current block 2100. The availability determiner 2410 first determines availability of the first adjacent pixel P(−1,−1) 2110. If it is determined that the first adjacent pixel P(−1,−1) 2110 is unavailable, the replacer 2420 searches for an available adjacent pixel in the adjacent pixels sequentially according to a predetermined direction based on the first adjacent pixel P(−1,−1) 2110, and replaces the first adjacent pixel P(−1,−1) 2110 with an initially found available adjacent pixel (hereinafter, referred to as a second adjacent pixel). For example, the replacer 2420 searches top and upper right adjacent pixels of the current block 2100 according to a first search direction from left to right based on the first adjacent pixel P(−1,−1) 2110, and if the second adjacent pixel does not exist in the top and upper right adjacent pixels of the current block 2100, searches for the second adjacent block by searching left and lower left adjacent pixels of the current block 2100 from top to bottom based on the first adjacent pixel P(−1,−1) 2110. The replacer 2420 replaces the first adjacent pixel P(−1,−1) 2110 with the second adjacent pixel that is initially found according to such a search direction and order. For example, if an adjacent pixel P(nT−2,−1) 2120 is the second adjacent pixel that is initially found in the top and upper right adjacent pixels, the replacer 2420 replaces a pixel value of the first adjacent pixel P(−1,−1) 2110 with a pixel value of the second adjacent pixel P(nT−2,−1) 2120.

The replacer 2420 replaces the remaining unavailable third adjacent pixel, excluding the first adjacent pixel P(−1,−1) 2110, with an adjacent pixel that is previously processed and replaced based on a predetermined search direction, or an originally available adjacent pixel. For example, the replacer 2420 replaces the first adjacent pixel P(−1,−1) 2110 with the second adjacent pixel P(nT−2,−1) 2120, and then replaces a following unavailable adjacent pixel P(0,−1) with the first adjacent pixel P(−1,−1) 2110. Since the first adjacent pixel P(−1,−1) 2110 is replaced with the second adjacent pixel P(nT−2,−1) 2120, the adjacent pixel P(0,−1) has the same value as the second adjacent pixel P(nT−2,−1) 2120. If the first adjacent pixel P(−1,−1) 2110 is originally available, a process of replacing the first adjacent pixel P(−1,−1) 2110 is skipped, and thus the replacer 2420 replaces the pixel value of the adjacent pixel P(0,−1) with the pixel value of the first adjacent pixel P(−1,−1) 2110. A pixel value of an adjacent pixel P(1,−1) is replaced with a pre-processed pixel value of the adjacent pixel P(0,−1).

Such a replacing process is repeated for all unavailable third adjacent pixels. In FIG. 21, the second adjacent pixel P(nT−2,−1) 2120 that is available from among the top adjacent pixels is not replaced and maintains its original pixel value. As such, the replacer 2420 replaces an unavailable top adjacent pixel with an adjacent pixel that is pre-replaced or an originally available adjacent pixel according to a predetermined search direction. In other words, excluding the first adjacent pixel P(−1,−1) 2110 and the originally available adjacent pixel, the replacer 2420 replaces the third adjacent pixel by an immediately left adjacent pixel if a search direction is from left to right. As such, when a plurality of third adjacent pixels exist at the top of the current block 2100, the replacer 2420 sequentially replaces the third adjacent pixels from left to right with a respective left adjacent pixel. Here, the left adjacent pixel used to replace the third adjacent pixel may be a previously replaced or originally available adjacent pixel. Similarly, the replacer 2420 replaces the third adjacent pixel that is unavailable from among the left and lower left adjacent pixels of the current block 2100 with an immediately above adjacent pixel. For example, the replacer 2420 replaces an unavailable adjacent pixel $P(-1,0)$ by the first adjacent pixel $P(-1,-1)$ 2110. As described above, if the first adjacent pixel $P(-1,-1)$ 2110 is originally available, the process of replacing the first adjacent pixel $P(-1,-1)$ 2110 is skipped, and thus the replacer 2420 replaces the adjacent pixel $P(-1,0)$ with the first adjacent pixel $P(-1,-1)$ 2110. A pixel value of an adjacent pixel $P(-1, 1)$ is replaced with a pre-processed pixel value of the adjacent pixel $P(-1,0)$. Like the process of replacing the top third adjacent pixels described above, if a plurality of third adjacent pixels exist to the left of the current block 2100, the replacer 2420 sequentially replaces the third adjacent pixels from top to bottom with a respective top adjacent pixel. Here, the top adjacent pixel used to replace the third adjacent pixel may be a pre-replaced or originally available adjacent pixel.

Such a replacing process is repeated for all left and lower left third adjacent pixels that are unavailable. An adjacent pixel $P(-1,nT+1)$ 2130 available from among the left adjacent pixels is not replaced but maintains its original pixel value. As such, the replacer 2420 replaces the left adjacent pixel that is unavailable with a pre-replaced or originally available adjacent pixel according to a predetermined search direction. In other words, if a search direction is from top to bottom, the replacer 2420 replaces the third adjacent pixel with an immediately above adjacent pixel. Alternatively, if all adjacent pixels available at the top and left of the current block 2100 are searched for, the replacer 2420 may replace the first adjacent pixel $P(-1,-1)$ with an average value of the found adjacent pixels. For example, in FIG. 21, a pixel value of the first adjacent pixel $P(-1,-1)$ may be replaced with an average value of the second adjacent pixel $P(nT-2,-1)$ 2120 initially found to be available from among the top adjacent pixels and the adjacent pixel $P(-1,nT+1)$ 2130 initially found to be available from among the left adjacent pixels. In other words, when PRA denotes a pixel value of the second adjacent pixel $P(nT-2, -1)$ 2120 and PLB denotes a pixel value of the adjacent pixel $P(-1, nT+1)$ 2130, an average value PT obtained via an equation; $PT=(PRA+PLB+1)>>1$ may replace the pixel value of the first adjacent pixel $P(-1,-1)$ 2110.

Alternatively, if all adjacent pixels available at the top and left of the current block 2100 are searched for, the replacer 2420 may replace the first adjacent pixel $P(-1,-1)$ 2110 by determining an available adjacent pixel closer to the first adjacent pixel $P(-1,-1)$ 2110 based on a distance from the first adjacent pixel $P(-1,-1)$ 2110 as the second adjacent pixel, instead of only using the adjacent pixel initially found according to the predetermined search direction. In FIG. 21, since a distance between the first adjacent pixel $P(-1,-1)$ 2110 and the second adjacent pixel $P(nT-2,-1)$ 2120 initially found to be available at the top of the current block 2100 is $(nT-2)-(-1)$, i.e., $nT-1$ and a distance between the first adjacent pixel $P(-1,-1)$ 2110 and the adjacent pixel $P(-1,nT+1)$ 2130 initially found to be available at the left of the current block 2100 is $(nT+1)-(-1)$, i.e., $nT+2$, the replacer 2420 may replace the first adjacent pixel $P(-1,-1)$ 2110 with the second adjacent pixel $P(nT-2, -1)$ 2120.

Alternatively, in order to reduce complexity of a process of searching for a second adjacent pixel for replacing the first adjacent pixel $P(-1,-1)$ 2110, the replacer 2420 may only search pixels $P(-1,0)$ and $P(0,-1)$ immediately adjacent to the first adjacent pixel $P(-1,-1)$ 2110 instead of searching all adjacent pixels at the top and left of the current block 2110, and may replace the first adjacent pixel $P(-1,-1)$ 2110 with an available adjacent pixel from among the pixels $P(-1,0)$ and $P(0,-1)$. For example, the replacer 2420 may search adjacent pixels in an order of the pixels $P(-1,0)$ and $P(0,-1)$ or vice versa, and replace the first adjacent pixel $P(-1,-1)$ 2110 with a pixel value of an available adjacent pixel that is found first. If an available adjacent pixel is not found in the pixels $P(-1,0)$ and $P(0,-1)$, the replacer 2420 may replace the first adjacent pixel $P(-1,-1)$ 2110 with a predetermined value based on a bit depth as described above. If both of the pixels $P(-1,0)$ and $P(0,-1)$ are available, the replacer 2420 may replace the first adjacent pixel $P(-1,-1)$ 2110 with using an average value of the pixels $P(-1,0)$ and $P(0,-1)$.

Meanwhile, a search order and a search direction of the top and left adjacent pixels may be changed. In other words, the replacer 2420 may first search left and lower left adjacent pixels of the current block 2100, and if an available adjacent pixel is not found, may then search top and upper right adjacent pixels. Also, instead of searching for an available adjacent pixel by searching the left and lower left adjacent pixels from top to bottom, the replacer 2420 may search the left and lower left adjacent pixels from bottom to top. Also, instead of searching for an available adjacent pixel by searching the top and upper right adjacent pixels from left to right, the replacer 2420 may search the top and upper right adjacent pixels from right to left.

Alternatively, the replacer 2420 may replace a pixel value of the first adjacent pixel $P(-1,-1)$ 2110 with an average value of all available adjacent pixels from among the top, upper right, left, and upper left adjacent pixels of the current block 2100, instead of using the initially found adjacent pixel available from among the top or left adjacent pixels in order to replace the first adjacent pixel $P(-1,-1)$ 2110.

FIG. 22 is a diagram for describing a process of replacing an unavailable adjacent pixel, according to another embodiment of the present invention.

Referring to FIG. 22, it is assumed that a first adjacent pixel whose availability is first determined from among adjacent pixels is an adjacent pixel $P(-1,2nT-1)$ 2210 located at the lowermost left of the current block 2200. In other words, the availability determiner 2410 first determines availability of the first adjacent pixel $P(-1,2nT-1)$ 2210. If it is determined that the first adjacent pixel $P(-1,2nT-1)$ 2210 is unavailable, the replacer 2420 searches for an available adjacent pixel from among the adjacent pixels sequentially according a predetermined order based on the first adjacent pixel $P(-1,2nT-1)$ 2210, and replaces the first adjacent pixel $P(-1,2nT-1)$ 2210 with an available second adjacent pixel that is initially found. For example, the replacer 2420 searches left and lower left adjacent pixels of the current block 2200 according to a first search direction from bottom to top based on the first adjacent pixel $P(-1, 2nT-1)$ 2210, and if the available second adjacent pixel is not found in the left and lower left adjacent pixels, it searches for the available second adjacent pixel by searching top and upper right adjacent pixels of the current block 2200 according to a second search direction from left to right. The replacer 2420 replaces the first adjacent pixel $P(-1,2nT-1)$ 2210 with the available second adjacent pixel initially found according to such a search direction and a search order. For example, if an adjacent pixel P(−1, nT−2) 2220 from among the left adjacent pixels is the available second adjacent pixel that is initially found according to the search order, the replacer 2420 replaces a pixel value of the first adjacent pixel P(−1,2nT−1) 2210 by a pixel value of the second adjacent pixel P(−1, nT−2) 2220.

Similarly to the embodiment described above, the replacer 2420 replaces a remaining unavailable third adjacent pixel excluding the first adjacent pixel P(−1,2 nT−1) 2210 by a previously processed and replaced adjacent pixel or an originally available adjacent pixel based on a predetermined search direction. For example, the replacer 2420 replaces the first adjacent pixel P(−1,2nT−1) 2210 with the second adjacent pixel P(−1, nT−2) 2220, and then replaces a following unavailable adjacent pixel P(−1, 2nT−2) with the first adjacent pixel P(−1,2nT−1) 2210. If the first adjacent pixel P(−1, 2nT−1) 2210 is originally available, a process of replacing the first adjacent pixel P(−1, 2nT−1) 2210 is skipped, and thus the replacer 2420 replaces a pixel value of the adjacent pixel P(−1, 2nT−2) with the pixel value of the first adjacent pixel P(−1, 2nT−1) 2210.

Such a replacing process is repeated for all unavailable third adjacent pixels. In FIG. 22, the second adjacent pixel P(−1, nT−2) 2220 and an adjacent pixel P(nT+1, −1) 2230 that are available from among the left and top adjacent pixels are not replaced and maintain their original pixel values. As such, the replacer 2420 searches the left and top adjacent pixels of the current block 2200 respectively from top to bottom and from left to right based on the first adjacent pixel P(−1, 2nT−1) 2210, and replaces the third adjacent pixel by an immediately below or left adjacent pixel. In other words, the replacer 2420 replaces the unavailable third adjacent pixels located at left and lower left of the current block 2200, excluding the first adjacent pixel P(−1, 2nT−1) 2210 and the originally available adjacent pixel, with the respective immediately below adjacent pixel, and replaces the unavailable third adjacent pixels located at the top and upper right of the current block 2200 with a respective immediately left adjacent pixel. As such, the replacer 2420 respectively replaces a plurality of third adjacent pixels located at the left of the current block 2200 from bottom to top with a respective below adjacent pixel, and respectively replaces a plurality of third adjacent pixels located at the top of the current block 2200 from left to right with a respective left adjacent pixel. As described above, the respective bottom or left adjacent pixel used for replacement may be a pre-replaced or originally available adjacent pixel.

As described above, a search order or a search direction of the top and left adjacent pixels may be changed. In other words, the replacer 2420 may first search the top and upper right adjacent pixels of the current block 2200 from right to left, and if an adjacent pixel is unavailable, may then search the left and lower left adjacent pixels of the current block 2200 from top to bottom to search for a second adjacent pixel for replacing the first adjacent pixel P(−1,2nT−1) 2210.

FIG. 23 is a diagram for describing a process of replacing an unavailable adjacent pixel, according to another embodiment of the present invention.

Referring to FIG. 23, it is assumed that a first adjacent pixel whose availability is initially determined from among adjacent pixels is an adjacent pixel P(2nT−1,−1) 2310 located to an upper rightmost of the current block 2300. In other words, the availability determiner 2410 first determines availability of the first adjacent pixel P(2nT−1,−1) 2310. If the first adjacent pixel P(2nT−1,−1) 2310 is determined to be unavailable, the replacer 2420 searches for an available adjacent pixel by sequentially searching the adjacent pixels according to a predetermined direction based on the first adjacent pixel P(2nT−1,−1) 2310, and replaces the first adjacent pixel P(2nT−1,−1) 2310 by an available second adjacent pixel initially found. For example, the replacer 2420 searches top and upper right adjacent pixels of the current block 2300 according to a first search direction from right to left based on the first adjacent pixel P(2nT−1,−1) 2310, and if the second adjacent pixel is unavailable in the top and upper right adjacent pixels, searches for the available second adjacent pixel by searching left and lower left adjacent pixels of the current block 2300 from top to bottom. The replacer 2420 replaces the first adjacent pixel P(2nT−1,−1) 2310 with the available second adjacent pixel initially found according to such a search direction and search order. For example, when an adjacent pixel P(nT+1,−1) 2320 from among the top adjacent pixels is an available second adjacent pixel that is initially found according to a search order, the replacer 2420 replaces a pixel value of the first adjacent pixel P(2nT−1, −1) 2310 with a pixel value of the second adjacent pixel P(nT+1, −1) 2320.

Also, the replacer 2420 replaces a remaining unavailable third adjacent pixel excluding the first adjacent pixel P(2nT−1,−1) 2310, with a pre-processed and replaced or originally available adjacent pixel based on a predetermined search direction. For example, the replacer 2420 replaces the first adjacent pixel P(2nT−1,−1) 2310 with the second adjacent pixel P(nT+1,−1), and then replaces a following unavailable adjacent pixel P(2nT−2,−1) with the first adjacent pixel P(2nT−1,−1) 2310.

If the first adjacent pixel P(2nT−1,−1) 2310 is originally available, a process of replacing the first adjacent pixel P(2nT−1,−1) 2310 is skipped, and thus the replacer 2420 replaces a pixel value of the adjacent pixel P(2nT−2,−1) with an original pixel value of the first adjacent pixel P(2nT−1,−1) 2310.

Such a replacing process is repeated on all unavailable third adjacent pixels. In FIG. 23, the available second adjacent pixel P(nT+1,−1) 2320 and an available adjacent pixel P(−1,nT−1) 2330 from among the left and top adjacent pixels are not replaced and maintain their original pixel values. As such, the replacer 2420 searches the top and left adjacent pixels of the current block 2300 respectively from right to left and from top to bottom based on the first adjacent pixel P(2nT−1,−1) 2310, and sequentially replaces the unavailable third adjacent pixels with a respective left or top adjacent pixel. In other words, the replacer 2420 sequentially replaces the unavailable third adjacent pixels located at the top and upper right of the current block 2300 with a respective immediately left adjacent pixel, and the unavailable third adjacent pixels located at the left and lower left of the current block 2300 by a respective immediately above adjacent pixel, excluding the first adjacent pixel P(2nT−1,−1) 2310 and an originally available adjacent pixel.

As described above, a search order and a search direction of the top and left adjacent pixels may be changed. In other words, the replacer 2420 first searches the left and lower left adjacent pixels of the current block 2300 from bottom to top, and if an adjacent pixel is unavailable, then searches the top and upper right adjacent pixels of the current block 2300 from left to right so as to search for a second adjacent pixel for replacing the first adjacent pixel P(2nT−1,−1) 2310.

Meanwhile, if a process of replacing unavailable adjacent pixels from among adjacent pixels is completed, a process of filtering the adjacent pixels may be performed. Whether to use a filtered adjacent pixel may be determined based on a size of a current block. For example, the filtered adjacent pixel may be used only when the size of the current block is 16×16.

Figure 25A:
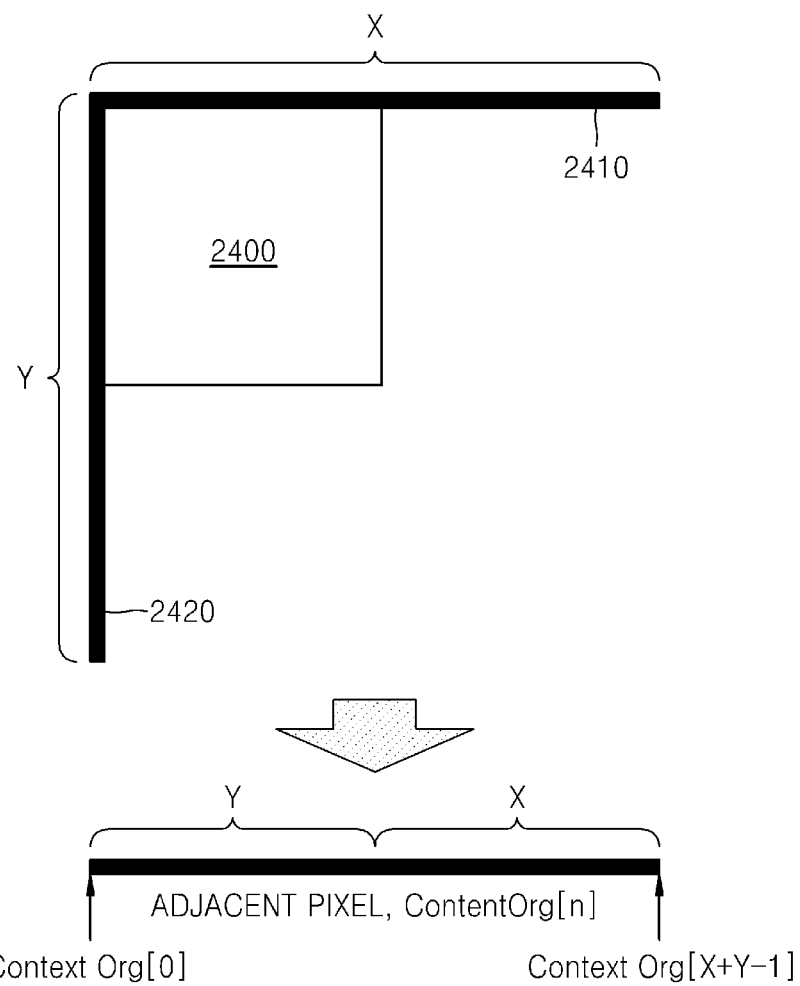
FIG. 25A is a diagram of a filtered adjacent pixel of a current block.

FIG. 25A is a diagram of filtered adjacent pixels 2510 and 2520 of a current block 2500.

Referring to FIG. 25A, the X adjacent pixels 2510 at the top of the current block 2500 and the Y adjacent pixels 2520 to the left of the current block 2500 may be filtered at least once, and a filtered adjacent pixel may be used for intra prediction of the current block 2500. Here, when a size of the current block 2500 is nT×nT, X may be 2nT and Y may be 2nT.

When ContextOrg[n] denotes X+Y original adjacent pixels at the top and left of the current block 2500 having the size of nT×nT, wherein n is an integer from 0 to X+Y−1, n is 0 in an adjacent lowest pixel from among left adjacent pixels, i.e., ContextOrg[0], and n is X+Y−1 in a rightmost adjacent pixel from among top adjacent pixels, i.e., ContextOrg[X+Y−1].

Figure 25B:
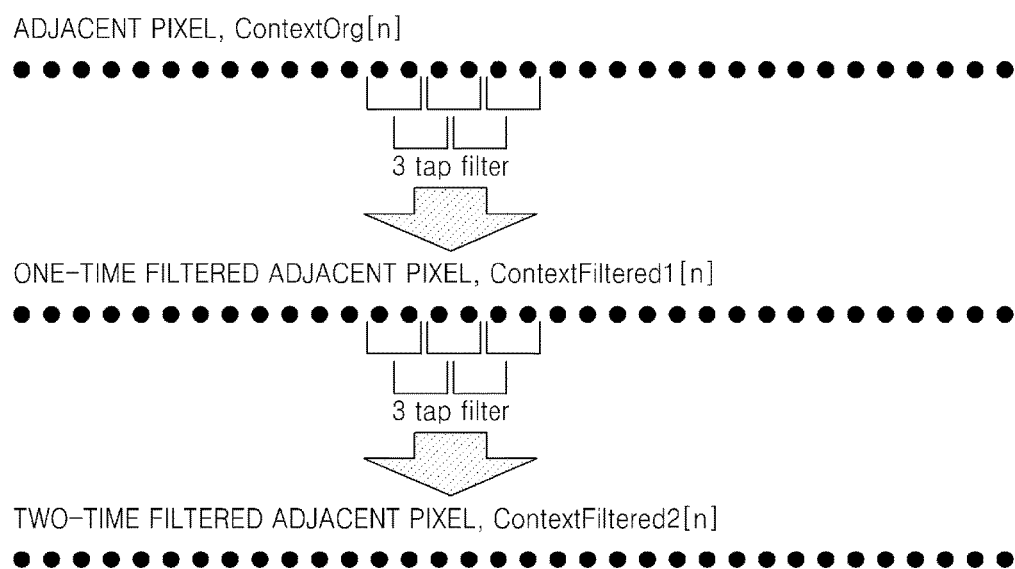
FIG. 25B is a reference diagram for describing a filtering process of an adjacent pixel of a current block.

FIG. 25B is a reference diagram for describing a filtering process of an adjacent pixel of a current block.

Referring to FIG. 25B, when ContextOrg[n] denotes adjacent pixels at the top and left of a current block, wherein n is an integer from 0 to 4nT−1, the adjacent pixels may be filtered via a weighted average value between the adjacent pixels. When ContextFiltered1[n] denotes a one-time filtered adjacent pixel, adjacent pixels filtered by applying a 3-tap filter to the adjacent pixels ContextOrg[n] may be obtained according to an equation ContextFiltered1[n]= (ContextOrg[n−1]+2*ContextOrg[n]+ContextOrg[n+1])/4. Similarly, a two-time filtered adjacent pixel ContextFiltered2[n] may be generated by again calculating a weighted average value between the one-time filtered adjacent pixels ContextFiltered1[n]. For example, adjacent pixels filtered by applying a 3-tap filter to the filtered adjacent pixels ContextFiltered1[n] may be generated according to an equation ContextFiltered2[n]=(ContextFiltered1[n−1]+2*ContextFiltered1[n]+ContextFiltered1[n+1])/4. A filter used for filtering and a number of times filtering is performed may vary.

Figure 26:
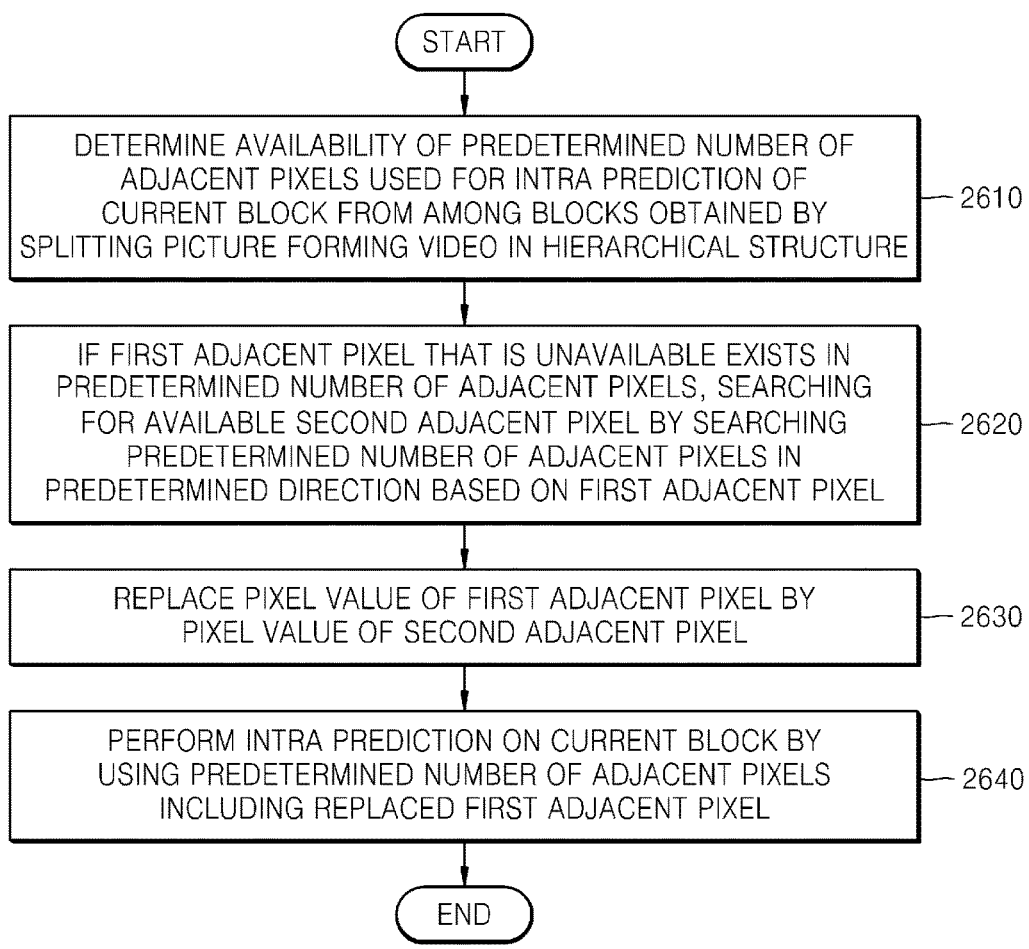
FIG. 26 is a flowchart illustrating a method of intra predicting a video, according to an embodiment of the present invention.

FIG. 26 is a flowchart illustrating a method of intra predicting a video, according to an embodiment of the present invention.

In operation 2610, the availability determiner 2410 determines availability of a predetermined number of adjacent pixels used for intra prediction of a current block from among blocks obtained by splitting a picture forming a video in a hierarchical structure. As described above, if an adjacent pixel included in an adjacent block of a different slice from a slice including an inter-predicted adjacent block or the current block exists from among the predetermined number of adjacent pixels, the availability determiner 2410 determines the corresponding adjacent pixel as an unavailable adjacent pixel.

In operation 2620, if a first adjacent pixel is unavailable in the predetermined number of adjacent pixels, the replacer 2420 searches for an available second adjacent pixel by searching the predetermined number of adjacent pixels in a predetermined direction based on the first adjacent pixel. In operation 2630, the replacer 2420 replaces a pixel value of the first adjacent pixel with a pixel value of the second adjacent pixel. If the first adjacent pixel at a predetermined location is available, the first adjacent pixel is used as a reference pixel for the intra prediction of the current block, and a process of replacing the first adjacent pixel is skipped. As such, when the first adjacent pixel is unavailable and thus replaced with the second adjacent pixel or is available and thus the replacing process is skipped, a process of replacing an unavailable third adjacent pixel from among the adjacent pixels is performed.

As described above, the replacer 2420 according to an embodiment determines availability of a first adjacent pixel located at an uppermost left corner of the current block, if the first adjacent pixel is unavailable, searches for the available second adjacent pixel by searching top and upper right adjacent pixels from left to right based on the first adjacent pixel, and if the second adjacent pixel is unavailable in the top and upper right adjacent pixels, searches for the available second adjacent pixel by searching left and lower left adjacent pixels from top to bottom based on the first adjacent pixel. The replacer 2420 determines an available adjacent pixel initially found according to such a search direction and a search order as the second adjacent pixel. Then, the replacer 2420 replaces the pixel value of the first adjacent pixel with the pixel value of the second adjacent pixel. Also, the replacer 2420 replaces an unavailable at least one third adjacent pixel located to the left and lower left of the current block with an immediately above adjacent pixel, excluding the first adjacent pixel and an originally available adjacent pixel, and replaces an unavailable at least one third adjacent pixel located at the top and upper right of the current block by an immediately left adjacent pixel. In other words, the replacer 2420 performs a process of replacing the unavailable third adjacent pixels at other locations, excluding the first adjacent pixel at a predetermined location, by using an immediately adjacent pixel in a predetermined direction.

The replacer 2420 according to another embodiment determines availability of a first adjacent pixel located at the lowermost left of the current block, and if the first adjacent pixel is unavailable, determines an initially found available adjacent pixel as the second adjacent pixel by searching the left and lower left adjacent pixels from bottom to top based on the first adjacent pixel. If the second adjacent pixel is unavailable in the left and lower left adjacent pixels, the replacer 2420 determines an initially found available adjacent pixel as the second adjacent pixel by searching the top and upper right adjacent pixels from left to right. Also, the replacer 2420 replaces the pixel value of the first adjacent pixel with the pixel value of the second adjacent pixel. Also, the replacer 2420 sequentially replaces the unavailable third adjacent pixels at the left and lower left by the respective immediately below adjacent pixel, and the unavailable third adjacent pixels at the top and upper right by the respective immediately left adjacent pixel, excluding the first adjacent pixel and the originally available adjacent pixel. In other words, the replacer 2420 performs a process of replacing the unavailable third adjacent pixels at other locations by an immediately adjacent pixel in a predetermined direction, excluding the first adjacent pixel at the predetermined location.

The replacer 2420 according to another embodiment determines availability of a first adjacent pixel located at the upper rightmost of the current block, and if the first adjacent pixel is unavailable, determines an initially found available adjacent pixel as the second adjacent pixel by searching top and upper right adjacent pixels from right to left based on the first adjacent pixel. If the second adjacent pixel is unavailable in the top and upper right adjacent pixels, the replacer 2420 determines an initially found available adjacent pixel as the second adjacent pixel by searching left and lower left adjacent pixels from top to bottom. Then, the replacer 2420 replaces a pixel value of the first adjacent pixel with a pixel value of the second adjacent pixel. Also, the replacer 2420 replaces an unavailable at least one third adjacent pixel located at the top and upper right of the current block by an immediately right adjacent pixel, and replaces an unavailable at least one third adjacent pixel located to the left and lower left of the current block by an immediately above adjacent pixel, excluding the first adjacent pixel and an originally available adjacent pixel. In other words, the replacer 2420 performs a process of replacing the unavailable third adjacent pixels at other locations, excluding the first adjacent pixel at a predetermined location, with an immediately adjacent pixel in a predetermined direction. In operation 2640, the intra prediction performer 2430 performs intra prediction on the current block by using the original adjacent pixels and the adjacent pixels replaced according to availability.

As described above, the complexity of a process of determining a reference pixel used for intra prediction may be reduced by searching for and replacing an available adjacent pixel, based on a predetermined search direction, with an unavailable adjacent pixel.

As programs for realizing the inter prediction method described with reference to FIGS. 1 through 26 are stored in the computer-readable recording media, an independent computer system may easily realize operations according to the programs stored in the computer-readable recording media.

A computer-readable recording medium storing a program, e.g., a disc 26000, according to an embodiment of the present invention will now be described in detail.

Figure 27A:
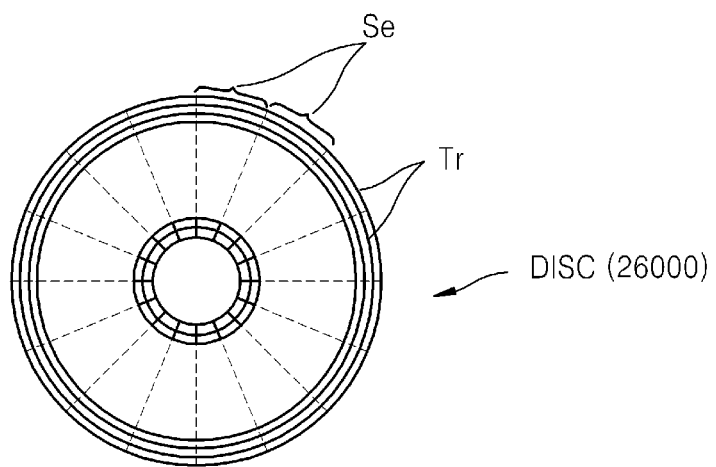
FIG. 27A illustrates a physical structure of a disc that stores a program, according to an embodiment of the present invention.

FIG. 27A is a diagram of a physical structure of the disc 26000 in which a program is stored, according to an embodiment of the present invention. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the inter prediction method described above may be assigned and stored.

A computer system embodied using a storage medium that stores a program for executing the intra prediction method as described above will now be described with reference to FIG. 27B.

Figure 27B:
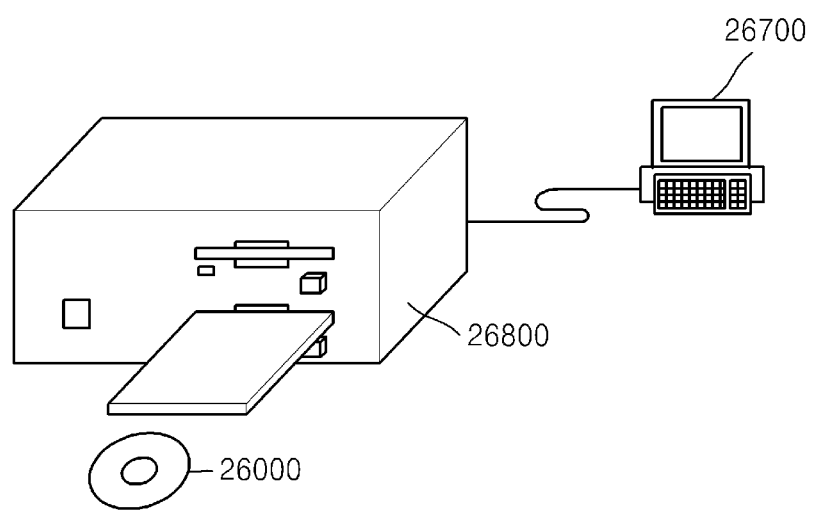
FIG. 27B illustrates a disc drive that records and reads a program by using a disc.

FIG. 27B is a diagram of a disc drive 26800 for recording and reading a program by using the disc 26000. A computer system 27000 may store a program that executes an intra prediction method according to an embodiment of the present invention, in the disc 26000 via the disc drive 26800. To run the program stored in the disc 26000 in the computer system 27000, the program may be read from the disc 26000 and be transmitted to the computer system 26700 by using the disc drive 27000.

The program that executes an intra prediction method according to an embodiment of the present invention may be stored not only in the disc 26000 illustrated in FIG. 27A or 27B but also in a memory card, a ROM cassette, or a solid state drive (SSD).

A system to which the intra prediction method described above are applied will be described below.

Figure 28:
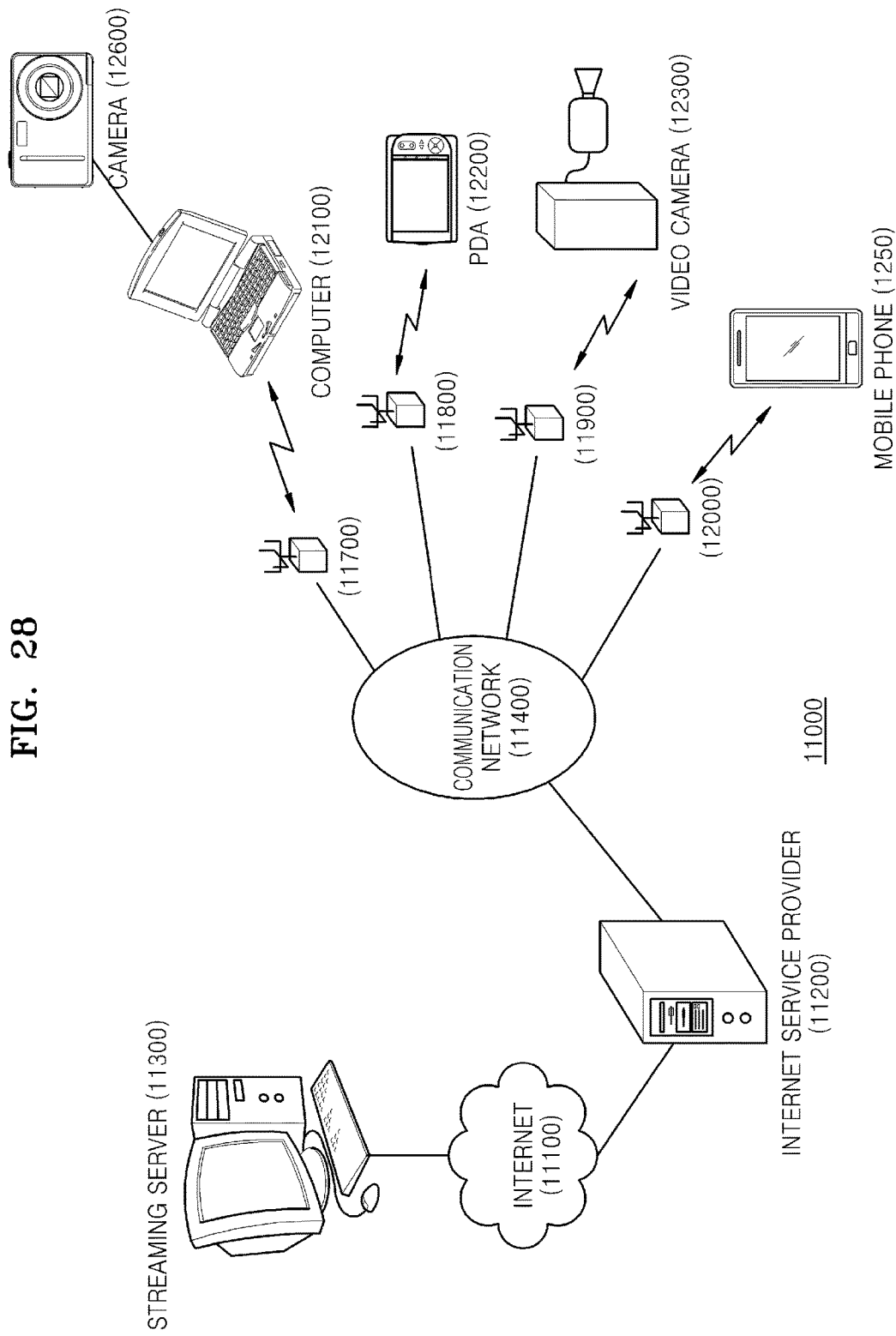
FIG. 28 illustrates an entire structure of a content supply system that provides a content distribution service.

FIG. 28 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 28, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive encoded content data and decode and reproduce the encoded content data in real time, thereby enabling personal broadcasting.

Encoding and decoding operations of the plurality of independent devices included in the content supply system 11000 may be similar to an intra prediction method according to an embodiment of the present invention.

The mobile phone 12500 included in the content supply system 11000 according to an embodiment of the present invention will now be described in greater detail with referring to FIGS. 29 and 30.

Figure 29:
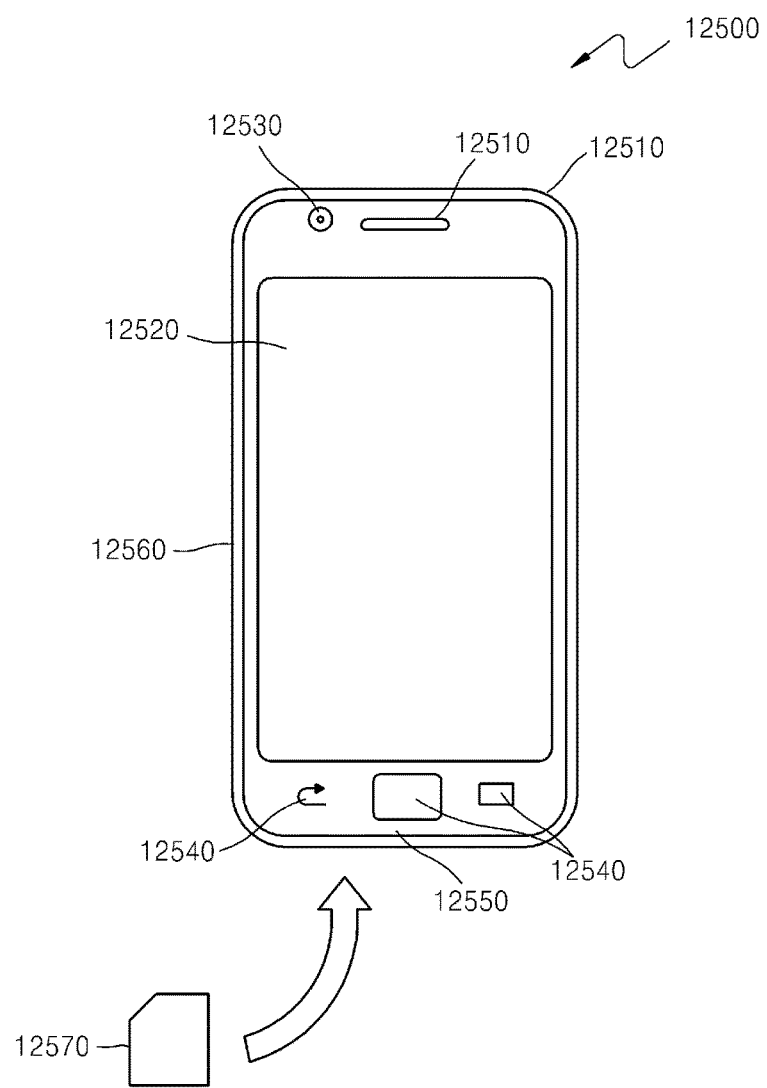
FIGS. 29 and 30 illustrate external and internal structures of a mobile phone to which a video encoding method and a video decoding method are applied, according to an embodiment of the present invention.

FIG. 29 illustrates an external structure of the mobile phone 12500 to which an intra prediction method are applied, according to an embodiment of the present invention. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 30:
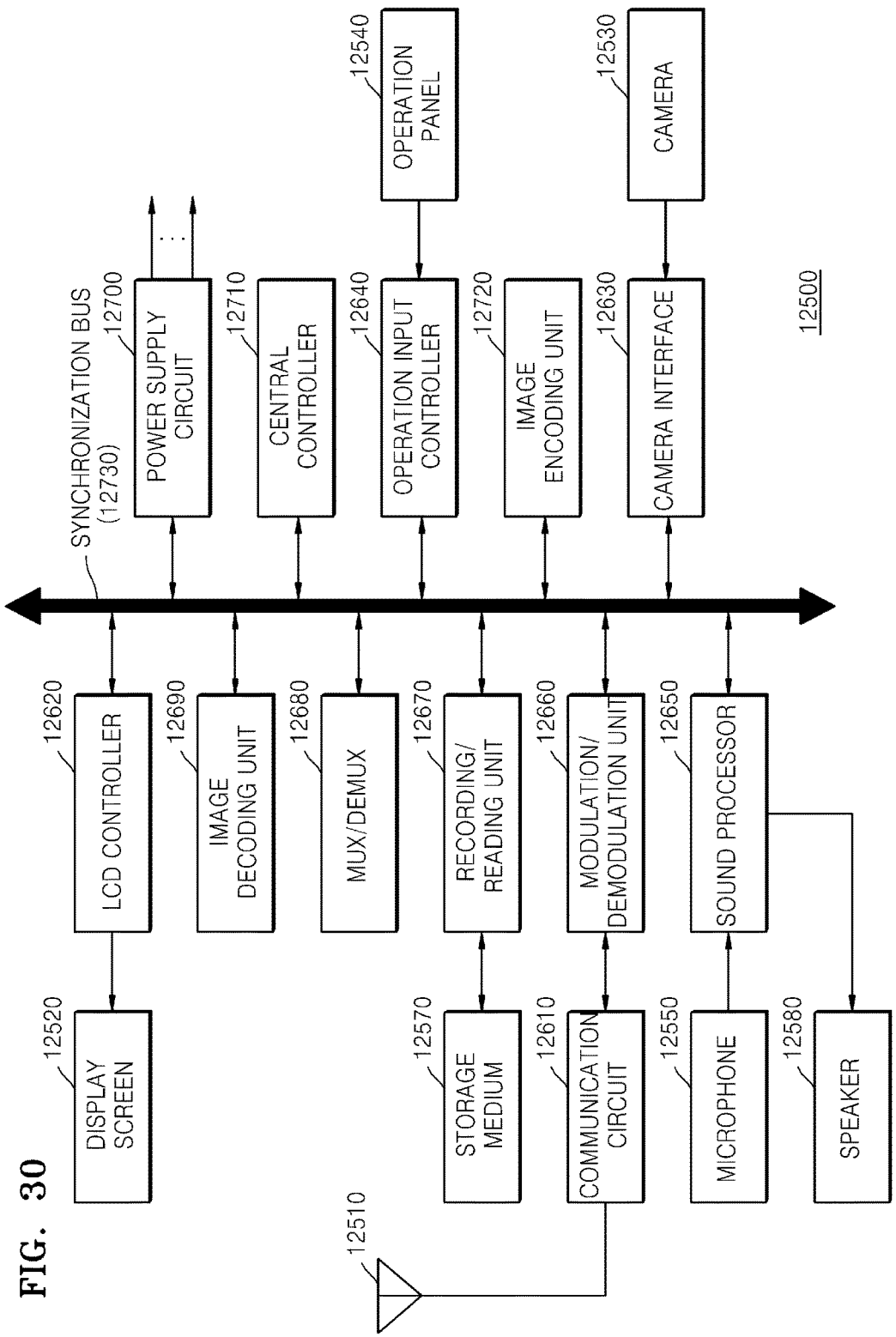

FIG. 30 illustrates an internal structure of the mobile phone 12500, according to an embodiment of the present invention. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to a video encoding method employed by the video encoding apparatus 100 or the image encoder 400 described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain restored video data and provide the restored video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment of the present invention, may be a transceiving terminal including only the video encoding apparatus, or may be a transceiving terminal including only the video decoding apparatus.

Figure 31:
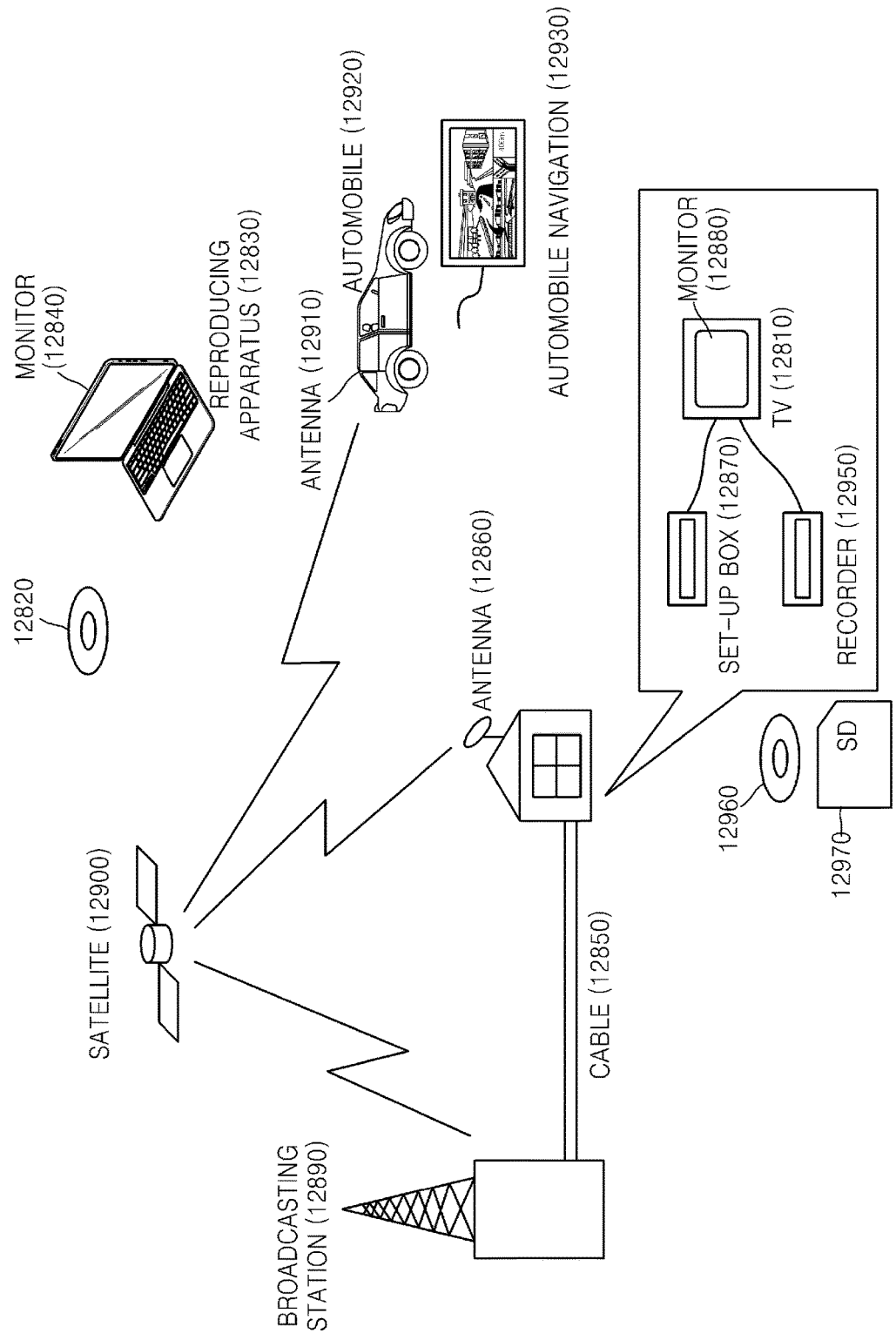
FIG. 31 illustrates a digital broadcasting system employing a communication system, according to an embodiment of the present invention.

A communication system according to the present invention is not limited to the communication system described above with reference to FIG. 28. For example, FIG. 31 illustrates a digital broadcasting system employing a communication system, according to an embodiment of the present invention. The digital broadcasting system of FIG. 31 may receive a digital broadcast transmitted via a satellite or a terrestrial network by using a video encoding apparatus and a video decoding apparatus according to an embodiment of the present invention.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an embodiment of the present invention is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an embodiment of the present invention may be installed. Data output from the set-top box 12870 may also be reproduced on a TV monitor 12880.

As another example, a video decoding apparatus according to an embodiment of the present invention may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to an embodiment of the present invention and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an embodiment of the present invention, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 30. For example, the computer 12100 and the TV receiver 12810 may not be included in the camera 12530, the camera interface 12630, and the image encoding unit 12720 of FIG. 30.

FIG. 32 is a diagram illustrating a network structure of a cloud computing system using a video encoding apparatus and a video decoding apparatus, according to an embodiment of the present invention.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 30.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above. As another example, the user terminal may include a video encoding apparatus as described above. Alternatively, the user terminal may include both the video decoding apparatus and the video encoding apparatus as described above.

Various applications of a video encoding method, a video decoding method, a video encoding apparatus, and a video decoding apparatus according to embodiments of the present invention described above have been described above with reference to FIGS. 27A to 32. However, methods of storing the video encoding method and the video decoding method in a storage medium or methods of implementing the video encoding apparatus and the video decoding apparatus in a device, according to various embodiments of the present invention, are not limited to the embodiments described above with reference to FIGS. 27A to 32.

According to one or more embodiments of the present invention, the complexity of a process of determining a reference pixel used for intra prediction may be reduced by searching for and replacing an available adjacent pixel, based on a predetermined search direction, with an unavailable adjacent pixel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for decoding a video, the apparatus comprising:
    one or more processors; and
    a memory storing a program which causes the one or more processors to:
    determine availability of a predetermined number of adjacent pixels used for intra prediction of a current block;
    when a first adjacent pixel among the predetermined number of adjacent pixels is unavailable, obtain a second adjacent pixel that is available by searching for the predetermined number of adjacent pixels in a predetermined direction based on the first adjacent pixel, and replace a pixel value of the first adjacent pixel with a pixel value of the second adjacent pixel; and
    perform intra prediction on the current block by using the predetermined number of adjacent pixels including the replaced first adjacent pixel,
    wherein the one or more processors determine an available adjacent pixel initially found to be the second adjacent pixel by searching for the predetermined number of adjacent pixels in the predetermined direction based on the first adjacent pixel, search for the second adjacent pixel by searching left and lower left adjacent pixels of the current block from bottom to top based on the first adjacent pixel, and when the second adjacent pixel is not found in the left and lower left adjacent pixels of the current block, search top and upper right adjacent pixels of the current block from left to right, and the first adjacent pixel is a lowermost left adjacent pixel from among left and lower left adjacent pixels of the current block,
    wherein, when a size of the current block is nT×nT, where nT is integer, the predetermined number of adjacent pixels is (4nT+1).

2. An apparatus for encoding a video, the apparatus comprising:
    one or more processors; and
    a memory storing a program which causes the one or more processors to:
    determining availability of pixel values on a predetermined number of adjacent pixel positions used for intra prediction of a current block from among blocks obtained by splitting a picture according to a hierarchical structure;
    when a pixel value on a first adjacent pixel position among the predetermined number of adjacent pixel positions is unavailable, searching for an available pixel value on a second adjacent pixel position by searching pixel values on the predetermined number of adjacent pixel positions in a predetermined direction based on the first adjacent pixel positions;
    replacing an unavailable pixel value on the first adjacent pixel position with an available pixel value on the second adjacent pixel position, to generate a new pixel value on the first adjacent pixel position;

performing intra prediction on the current block by using pixel values on the predetermined number of adjacent pixel positions comprising the new pixel value on the first adjacent pixel position; and outputting a residual data using the current block and an intra prediction value of the current block, wherein the first adjacent pixel position is a lowermost left adjacent pixel position from among left and lower left adjacent pixel positions of the current block wherein the searching for the second adjacent pixel values further comprises searching for the second adjacent pixel position by searching left and lower left adjacent pixel positions of the current block from bottom to top based on the first adjacent pixel position, and when the available pixel value on the second adjacent pixel position is not found among the left and lower left adjacent pixel positions of the current block, searching top and upper right adjacent pixel positions of the current block from left to right, wherein, when a size of the current block is nT×nT, where nT is integer, the predetermined number of adjacent pixel positions is (4nT+1).

3. An apparatus comprising a non-transitory computer-readable medium for storing thereon instructions that, when executed by one or more processors of the apparatus, cause the one or more processors to execute operations to generate image data corresponding to a video bitstream, the image data including:

an intra prediction mode of a current block; and a residual data obtained by using an intra prediction value of the current block, wherein the operations, executed using the at least one processor of the apparatus, include:

determining availability of pixel values on a predetermined number of adjacent pixel positions used for intra prediction of a current block from among blocks obtained by splitting a picture forming the video according to a hierarchical structure;

when a pixel value on a first adjacent pixel position among the predetermined number of adjacent pixel positions is unavailable, searching for an available pixel value on a second adjacent pixel position by searching pixel values on the predetermined number of adjacent pixel positions in a predetermined direction based on the first adjacent pixel positions;

replacing an unavailable pixel value on the first adjacent pixel position with an available pixel value on the second adjacent pixel position, to generate a new pixel value on the first adjacent pixel position; and performing intra prediction on the current block by using pixel values on the predetermined number of adjacent pixel positions comprising the new pixel value on the first adjacent pixel position, wherein the first adjacent pixel position is a lowermost left adjacent pixel position from among left and lower left adjacent pixel positions of the current block wherein the searching for the second adjacent pixel values further comprises searching for the second adjacent pixel position by searching left and lower left adjacent pixel positions of the current block from bottom to top based on the first adjacent pixel position, and when the available pixel value on the second adjacent pixel position is not found among the left and lower left adjacent pixel positions of the current block, searching top and upper right adjacent pixel positions of the current block from left to right, wherein, when a size of the current block is nT×nT, where nT is integer, the predetermined number of adjacent pixel positions is (4nT+1) including 2nT of left and lower left adjacent pixel positions, 2nT of top and upper right adjacent pixel positions, and one of top-left position of the current block.

* * * * *